(12) United States Patent
Zerweck et al.

(10) Patent No.: US 10,407,931 B2
(45) Date of Patent: Sep. 10, 2019

(54) MODULAR SWIMMING POOL CLEANER

(71) Applicant: AQUA PRODUCTS, INC., Cedar Grove, NJ (US)

(72) Inventors: Jason Zerweck, Media, PA (US); Alexsandr Klebanov, Bloomfield, NJ (US); William Londono, Bloomfield, NJ (US)

(73) Assignee: AQUA PRODUCTS, INC., Cedar Grove, NJ (US)

( * ) Notice: Subject to any disclaimer, the term of this patent is extended or adjusted under 35 U.S.C. 154(b) by 260 days.

(21) Appl. No.: 15/687,634

(22) Filed: Aug. 28, 2017

(65) Prior Publication Data

US 2018/0066443 A1 Mar. 8, 2018

Related U.S. Application Data

(60) Provisional application No. 62/382,936, filed on Sep. 2, 2016.

(51) Int. Cl.
| | |
|---|---|
| *B62D 55/06* | (2006.01) |
| *E04H 4/16* | (2006.01) |
| *B60F 3/00* | (2006.01) |
| *B62D 55/084* | (2006.01) |

(52) U.S. Cl.
CPC ......... *E04H 4/1654* (2013.01); *B60F 3/0015* (2013.01); *B62D 55/06* (2013.01); *B62D 55/084* (2013.01)

(58) Field of Classification Search
CPC ...... E04H 4/1654; B62D 55/06; B62D 55/084

USPC ............................................. 180/9, 9.1, 7.1
See application file for complete search history.

(56) References Cited

U.S. PATENT DOCUMENTS

| | | | |
|---|---|---|---|
| 4,779,749 A * | 10/1988 | Geiger | B65D 41/0478 215/295 |
| 5,097,559 A | 3/1992 | Brunt et al. | |
| 5,454,129 A | 10/1995 | Kell | |
| 5,709,007 A | 1/1998 | Chiang | |
| 6,548,982 B1 | 4/2003 | Papanikolopouls et al. | |
| 6,665,900 B2 | 12/2003 | Wichmann et al. | |
| 6,883,201 B2 | 4/2005 | Jones et al. | |
| 6,886,205 B1 | 5/2005 | Pichon | |
| 7,117,554 B2 | 10/2006 | Pichon | |
| 7,448,113 B2 | 11/2008 | Jones et al. | |

(Continued)

FOREIGN PATENT DOCUMENTS

| | | |
|---|---|---|
| CN | 201250529 Y | 6/2009 |
| CN | 101349117 A | 7/2009 |

(Continued)

*Primary Examiner* — Tony H Winner
(74) *Attorney, Agent, or Firm* — Kilpatrick Townsend & Stockton LLP; Dean W. Russell

(57) ABSTRACT

A modular pool cleaning robot is disclosed. The pool cleaning robot includes easily replaceable and/or interchangeable parts and allows for various end-user selectable configurations without the use of tools and without complex and time-consuming large-scale disassembly. Among these parts are a chassis and drive assembly. The drive assembly is removable securable to the chassis via a snap engagement effectuated by pressing the drive assembly against the chassis, without the use of any external fasteners or any tools. The drive assembly detaches from the chassis when a lateral force is exerted on the drive assembly.

9 Claims, 19 Drawing Sheets

(56) References Cited

U.S. PATENT DOCUMENTS

| | | |
|---|---|---|
| 7,571,511 B2 | 8/2009 | Jones et al. |
| 7,636,982 B2 | 12/2009 | Jones et al. |
| 7,908,697 B2 | 3/2011 | Lavabre et al. |
| 7,938,210 B2 | 5/2011 | Kunzler et al. |
| 8,012,345 B2 | 9/2011 | Hui |
| 8,110,098 B2 | 2/2012 | Hui |
| 8,201,649 B2 | 6/2012 | Andrus et al. |
| 8,393,032 B2 | 3/2013 | Pichon et al. |
| 8,393,033 B2 | 3/2013 | Pichon et al. |
| 8,393,034 B2 | 3/2013 | Pichon et al. |
| 8,474,090 B2 | 7/2013 | Jones et al. |
| 8,516,651 B2 | 8/2013 | Jones et al. |
| 8,555,445 B2 | 10/2013 | Fu et al. |
| 8,584,305 B2 | 11/2013 | Won et al. |
| 8,584,307 B2 | 11/2013 | Won et al. |
| 8,602,134 B2 | 12/2013 | Andrus et al. |
| 8,656,550 B2 | 2/2014 | Jones et al. |
| 8,671,507 B2 | 3/2014 | Jones et al. |
| 8,757,309 B2 | 6/2014 | Schmitt et al. |
| 8,763,199 B2 | 7/2014 | Jones et al. |
| 8,763,200 B2 | 7/2014 | Kim et al. |
| 9,004,200 B2 | 4/2015 | Ben-tzvi et al. |
| 9,038,233 B2 | 5/2015 | Jones et al. |
| 8,950,038 B2 | 9/2015 | Won et al. |
| 9,131,817 B2 | 9/2015 | Huang et al. |
| 9,167,946 B2 | 10/2015 | Jones et al. |
| 9,282,867 B2 | 3/2016 | Williams et al. |
| 10,301,837 B2 * | 5/2019 | Durvasula ............ E04H 4/1636 |
| 2003/0137268 A1 | 7/2003 | Papanikolopouls et al. |
| 2007/0028405 A1 | 2/2007 | Garti |
| 2008/0302586 A1 | 12/2008 | Yan |
| 2014/0031977 A1 | 1/2014 | Goldenberg et al. |
| 2014/0250613 A1 | 9/2014 | Jones et al. |
| 2014/0352103 A1 | 12/2014 | Won et al. |
| 2015/0306764 A1 | 10/2015 | Goldenberg et al. |
| 2016/0015232 A1 | 1/2016 | Nakamura et al. |
| 2016/0257357 A1 | 9/2016 | Ben-Tzvi et al. |
| 2016/0259336 A1 | 9/2016 | Lee et al. |

FOREIGN PATENT DOCUMENTS

| | | |
|---|---|---|
| CN | 101481957 A | 7/2009 |
| CN | 201358597 Y | 12/2009 |
| CN | 201395961 Y | 2/2010 |
| CN | 202467257 U | 10/2012 |
| CN | 102943576 A | 2/2013 |
| CN | 103967297 A | 8/2014 |
| DE | 102010017991 A1 | 10/2011 |
| FR | 2870281 A1 | 11/2005 |
| KR | 101622365 B1 | 5/2016 |
| WO | 11038602 A1 | 4/2011 |
| WO | 15005801 A1 | 1/2015 |

* cited by examiner

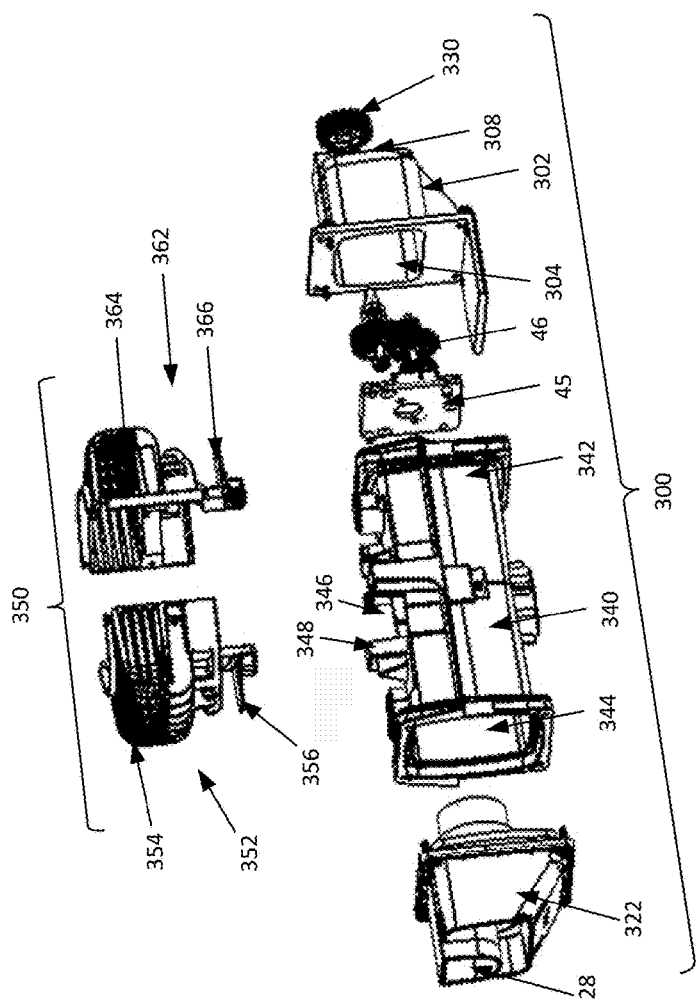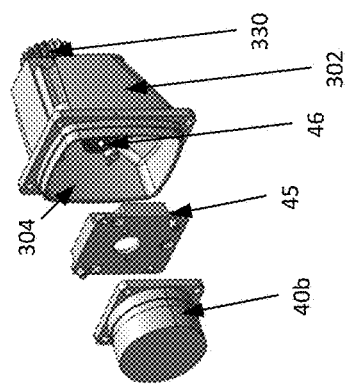
FIG. 14
FIG. 15A
FIG. 15B

MODULAR SWIMMING POOL CLEANER

CROSS-REFERENCE TO RELATED APPLICATIONS

This application claims priority to and the benefit of U.S. Provisional Patent Application No. 62/382,936, filed Sep. 2, 2016, and entitled "Modular Swimming Pool Cleaner," the disclosure of which is incorporated herein by reference in its entirety.

FIELD OF INVENTION

The present invention relates to the field of swimming pool cleaners and, in particular, motorized swimming pool cleaners.

BACKGROUND

In order to automate pool cleaning, many motorized or automatic pool cleaners have been developed. There are many different types of swimming pool cleaners; however, typically, motorized pool cleaners (also referred to as pool cleaning robots) are manufactured, assembled, and delivered as a ready to use or nearly ready to use pool cleaner (e.g., with zero or minor consumer assembly required). Over time, these pool cleaning robots will generally require some maintenance, part replacement, or some other repair due to the wear and tear associated with the underwater cleaning environment.

Unfortunately, since pool cleaning robots may be quite complicated and may be pre-assembled, this maintenance frequently requires an end user to transport the robot to a mechanic, the manufacturer, or some other specialized technical service provider familiar with the robot. Alternatively, an end-user may attempt to disassemble a pool robot with tools to try to assess and fix the problems on their own. However, often, an end user can only disassemble a small portion of the robot because the major components have been coupled together with specialized tools (e.g., tools machined or developed specifically for assembling/disassembling this particular robot). Moreover, even if the end user can determine the problem, a part or portion of the robot may be broken and, thus, may require a user to identify and order the correct replacement part. Consequently, regardless of how an end-user attempts to resolve a maintenance issue, an end-user will often be without a pool cleaning robot for an extended period of time, even when the maintenance issue is only a minor issue, such as replacing a broken brush. This is especially problematic in colder climates where the pool season many only last a few months.

Moreover, as technology advances, new parts, programming, and configurations may be developed for pool cleaning robots. These advancements may improve various aspects of pool cleaning (e.g., ability to navigate different pool shapes, clean different pool surfaces, increased robot efficiency or power, etc.); however, most pool cleaning robots cannot be upgraded and, instead, must be replaced to provide such a technological upgrade. In fact, many pool cleaning robots cannot even be reconfigured and, thus, are only useful for certain types or shapes of pools and may require a user to buy different robots for different pools or cleaning jobs. For example, many pool cleaning robots are provided by the manufacturer to the end-user in a compact, ready-to-use way, and the end user is given little or no choice on how to configure of the robot. Then, if a user notices a problem with the robot, the user has no options for adjusting the robot to try to overcome the problem (and the user may also be unable to return or exchange the robot since the problems may only become apparent during extended underwater use).

In view of at least the aforementioned issues, a modular pool cleaning robot that includes easily replaceable and/or interchangeable parts and allows for various end-user selectable configurations is desirable.

SUMMARY

The present invention relates to a motorized swimming pool cleaner. In accordance with at least one embodiment of the present invention, the swimming pool cleaner includes a drive motor that drives at least one of two interchangeable track or drive modules to propel the robot along surfaces (walls, floor, steps, coping, apron, pool deck, etc.) of a pool, above and below the surface of the water. The motion of the interchangeable drive module(s) may, in turn, impart rotation to one or more brushes included on the robot, so that the brushes scrub the inner surfaces of the pool to loosen or remove debris on the pool surfaces. This debris may then be collected with suction provided by a pump motor and gathered within an internal or external filter of the robot.

The present invention avoids problems posed by the known swimming pool cleaners (e.g., maintenance and configuration issues) by providing a swimming pool cleaner with modular components or assemblies. These components can be coupled together with rapidly releasable coupling mechanisms to provide a functional pool cleaning robot, insofar as a rapidly releasable coupling mechanism includes any coupling that can be rapidly achieved without the use of any specialized tools (e.g., without any tools) and without any special skills or knowledge, such that a rapidly releasable coupling mechanism can be engaged or disengaged easily by an end-user. For example, a rapidly releasable coupling mechanism may include snap-fitting mechanisms, tongue and groove mechanisms, resilient mechanisms (e.g., detents, living hinges, etc.), half-turn or quarter turn latches and/or plug and socket mechanisms. The components and assemblies of the pool cleaner may also be coupled together in a manner that allows each component or assembly to be individually removed from a fully assembled pool cleaning robot (and that allows components to be individually removed from assemblies) with removing or disassembling other components or assemblies. Consequently, each assembly or component can be quickly and easily replaced by an end-user.

Moreover, the modularity of the pool cleaning robots provided herein provides interchangeable parts (e.g., interchangeable drive assemblies) that minimize the number of parts needed for part replacement while also allowing for numerous configurations. Still further, the interchangeable and modular nature of the pool cleaning robot in accordance with the present invention allows for upgrades or upgraded parts to be easily incorporated into the pool cleaning robot by an end-user.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 14 is an exploded, front perspective view of the motor assembly of the swimming pool cleaner of FIG. 1, according to an exemplary embodiment.

FIGS. 15A and 15B are exploded views of exemplary drive motors that may be included in the motor assembly of FIG. 14.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the swimming pool cleaner in accordance with the present invention and provided herein includes a main body with frame or chassis portions that can be removably coupled together with rapidly releasable coupling mechanisms. Drive modules or assemblies (also referred to herein as a track assemblies or wheel assemblies), brush assemblies, and a motor assembly are each individually coupleable to the main body with similar rapidly releasable coupling mechanisms, such as snap-fit mechanisms, or other similar mechanisms which will be further explained below, such that each module or assembly can easily removed from the main body (e.g., without disassembling other portions of the pool cleaner). Consequently, an end-user may easily remove a component of the main body, a drive assembly, a brush assembly, and/or a motor assembly, or portion thereof, for maintenance, replacement, or repair. For example, in at least some embodiments, an end-user may be able to detach and replace a worn out brush assembly without disassembling other portions of the pool cleaner.

Easy removal and replacement also allows an end-user to reconfigure or upgrade the pool cleaner, if desired. For example, an end-user may easily reconfigure the pool cleaner between different drive configurations including any number of drive motors between one and four. Put briefly, the modular configuration allows the end-user to design and configure the swimming pool cleaner according to their needs, encouraging a do-it-yourself (DIY) approach that avoids timely and costly maintenance visits, and allowing the end-user to upgrade or improve their pool cleaner according to their needs.

Other pool cleaners may allow a user to disassemble specific parts of the pool cleaner; however, the specific parts may only provide access to specific components, like a filter, that must be frequently replaced. Meanwhile, the other portions or parts of the pool cleaner may only be removable with cleaner-specific tools (e.g., tools manufactured for a specific purpose or coupling) or may only be removable by a technical service to allow them to more easily access specific functional elements of the robot, such as the motor (instead of providing a removable, modular motor housing).

Figure 1:
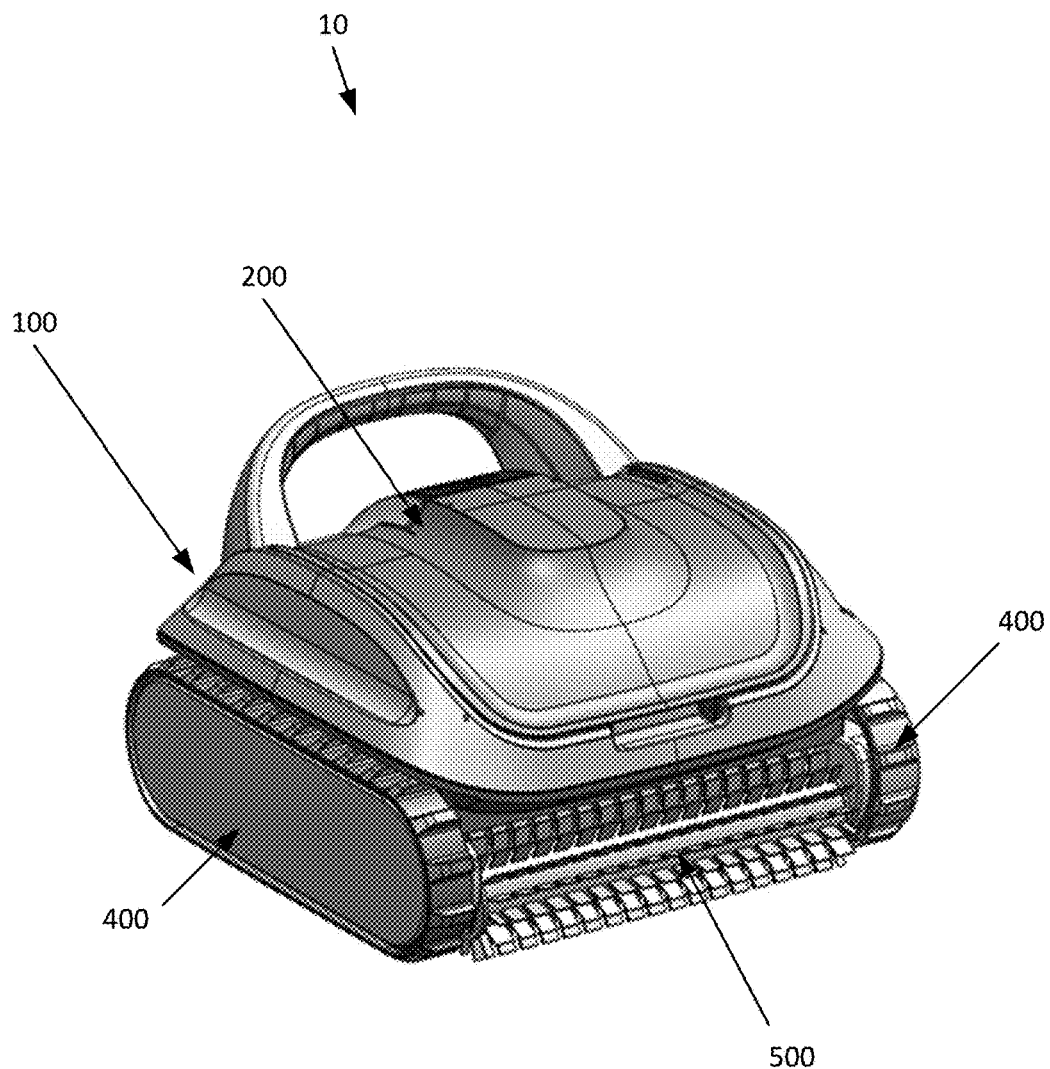
FIG. 1 is a front perspective view of a swimming pool cleaner, according to an exemplary embodiment of the present invention.
Figure 2:
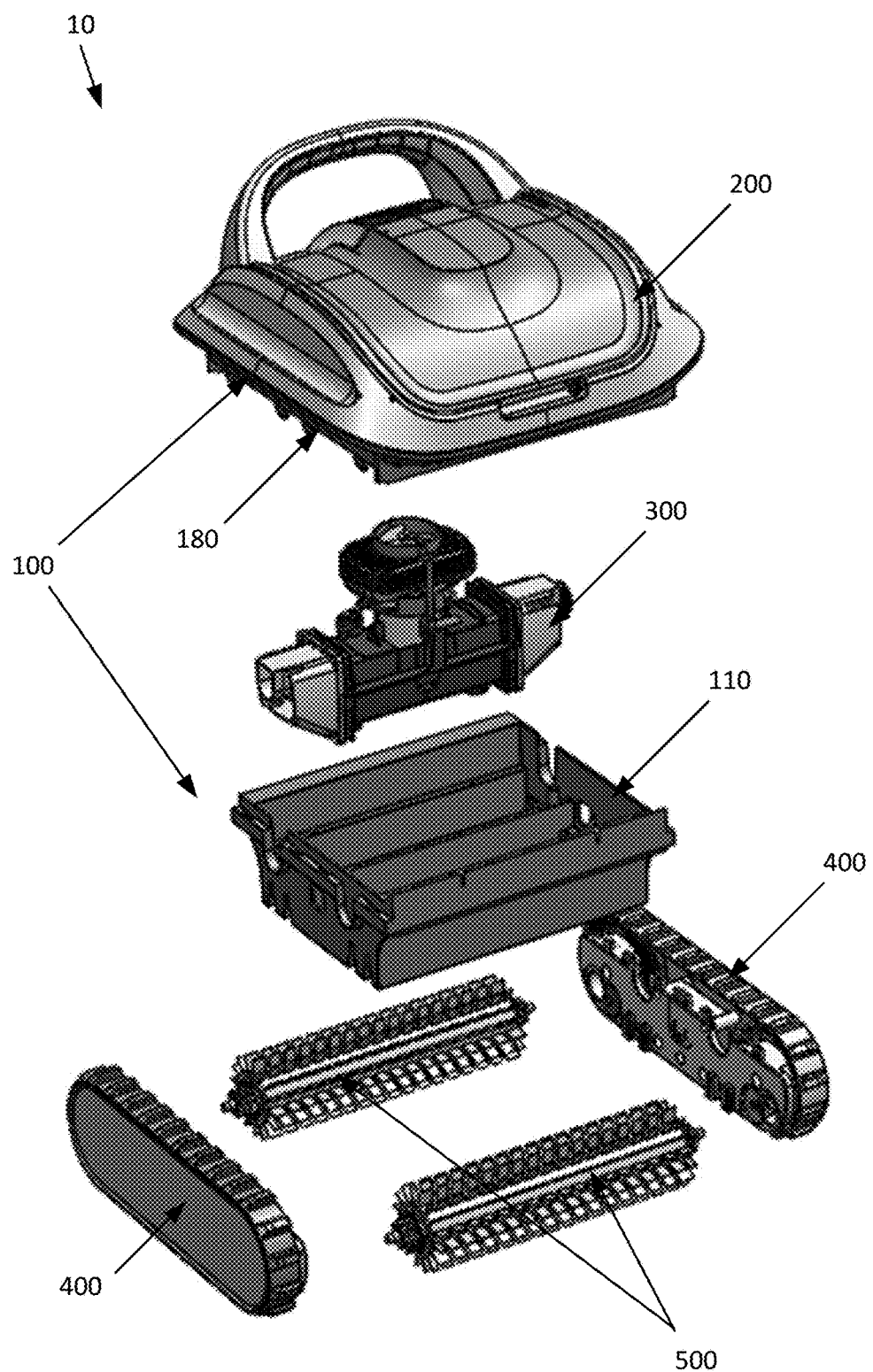
FIG. 2 is an exploded front perspective view of the swimming pool cleaner of FIG. 1 that illustrates a main body, two brush assemblies, two drive assemblies, and a motor assembly of the swimming pool cleaner.

Now referring to FIGS. 1 and 2 for a description of main components of an exemplary embodiment of a pool cleaner 10 in accordance with the present invention. FIG. 1 shows the pool cleaner 10 when fully assembled while FIG. 2 is an exploded view of the main components of the pool cleaner of FIG. 1. As can be seen best in FIG. 2, the pool cleaner 10 includes a main body 100, a motor housing 300, two drive assemblies 400 (also referred to herein as wheel or track assemblies), and two brush assemblies 500. The main body 100 includes a lower frame portion or chassis 110 and an upper frame portion or chassis 200 (also referred to as cover 200), and may also include an intermediate chassis or frame portion 180 configured to connect or couple the lower chassis 110 to the upper chassis 200. As is described in further detail below, the lower chassis 110 includes features that allow the track assemblies 400 and motor housing 300 to be coupled to the lower chassis 110 and each other. Moreover, the brush assemblies 500 may extend between the track assemblies 400 and be removably coupled thereto.

Figure 3:
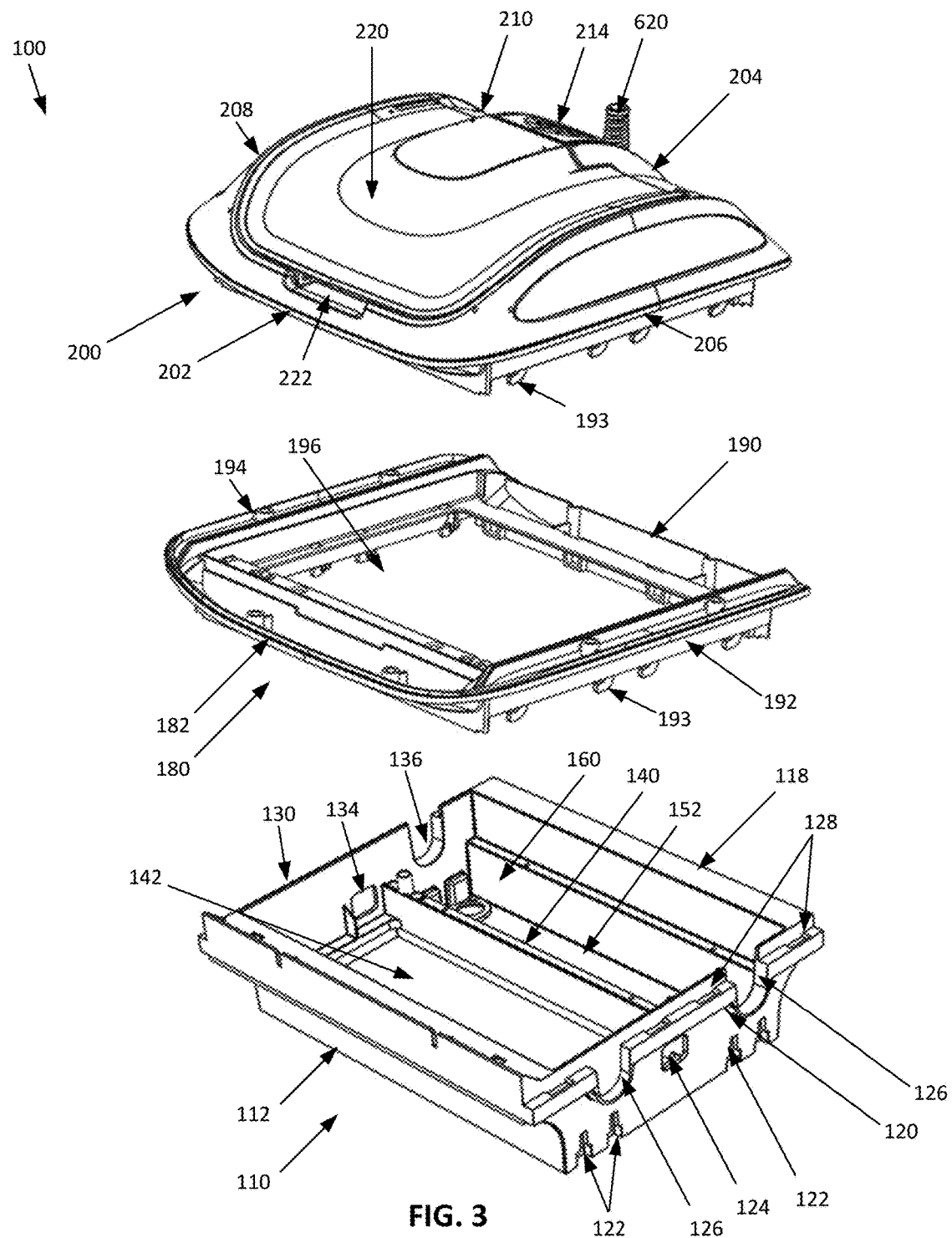
FIG. 3 is an exploded front perspective view of the main body of the swimming pool cleaner of FIG. 1 that illustrates a lower frame or chassis, an intermediate frame or chassis, and an upper frame or chassis (also referred to as a cover).

Now referring to FIG. 3, for a more detailed description of the main body 100. In FIG. 3, the upper chassis 200, intermediate chassis 180 and lower chassis 110 are each shown individually to illustrate the features of each individual component. Generally, the intermediate chassis 180 may be removably, rapidly coupled to the upper chassis 200 and lower chassis 110 in order to couple the upper chassis 200 to the lower chassis 110; however, in some embodiments, the main body 100 may not include an intermediate chassis 180 and the upper chassis 200 may be coupled directly to the lower chassis 110.

In the depicted embodiment, the lower chassis 110 is substantially cuboidal and includes a first end 112 (the front), a second end 118 (the rear or back end), a first side 120 and a second side 130. Extending therebetween is a bottom 140 with a first section 142 and a second section 152, which are described in more detail below in connection with FIG. 4. Collectively, the bottom 140, sides 120 and 130, first end 112, and second end 118 define an interior cavity that may, together with cavities or openings included in the intermediate chassis 180 and cover 200, provide an internal volume or space 160 in the pool cleaner 10 that may house any filtration components, motors, pumps, or other such mechanisms or components utilized by the pool cleaner 10.

In at least some embodiments, the lower chassis 110 may be preformed or pre-assembled as a single piece or part. However, in other embodiments, different features of the lower chassis 110 may be removably coupled thereto so that the features may be replaced without replacing the entire lower chassis 110. For example, in the depicted embodiment, the sides 120 and 130 of the lower chassis each include various molded or preformed features that allow a track assembly 400 and a lower plate (described in more detail below in connection with FIG. 4) to be attached thereto and a motor assembly to be installed therebetween; but in other embodiments, at least some of the features may be manufactured separately and removably coupled to the lower chassis 110 for easy replacement by an end-user. Alternatively, side 120 and side 130 could each be manufactured separately and subsequently attached to the front end 112 and the rear end 118 of the lower chassis 110 (with rapidly removable coupling mechanisms and/or any other coupling mechanism).

Still referring to FIG. 3, the first side 120 includes couplers or receiving portions 122, an opening 124, and a receivers 126 while the second side 130 includes couplers 132 (see FIG. 4), opening 134, and receivers 136. Notably, the features included on the first side 120 (e.g., couplers 122, an opening 124, and a receivers 126) mirror the features included on the second side 130 (couplers 132, opening 134, and receivers 136). As is explained in further detail below, this mirrored configuration allows the same track assembly 400 to be attached to either side, thereby providing increased modularity and interchangeability for the components of the pool cleaner 10. Additionally, in this embodiment, side 120 and side 130 may each include chassis openings 128 disposed on a top surface of the side 120, 130. As is explained in further detail below in connection with FIGS. 5, 6A-C, and 7A-C, these chassis openings 128 may contribute to or provide a rapidly removable coupling system between the lower chassis 110 and the intermediate chassis 180 and/or the cover 200.

Similar to the lower chassis 110, the intermediate chassis 180 includes a first end 182 (the front), a second end 190 (the rear or back end), a first side 192 and a second side 194 while the upper chassis 200 includes a first end 202 (the front), a second end 204 (the rear or back end), a first side 206 and a second side 208. The cover 200 also includes a top surface 210 that may define a top of the pool cleaner 10. In order to provide access to the interior space 160 the top surface 210 may include an openable or liftable section 220. An end user may easily grasp and lift (e.g., rotate about an unillustrated hinge) the liftable section 220 via an opening 222 included at the front end 202 of the cover 200 in order to access the interior space 160 (e.g., to remove and clean a filter installed in the pool cleaner 10).

In order to ensure the interior space 160 is free of obstructions, the ends 182, 190 and sides 192, 194 of the intermediate chassis 180 form a substantially annular member that surrounds an interior opening 196. In different embodiments, any portion of the intermediate chassis 180 may be any size or shape; however, preferably, the interior opening 196 is designed so that the intermediate chassis 180 does not obstruct or otherwise interfere with components installed in the interior space 160, as is explained below in further detail in connection with FIGS. 5, 6A-C, and 7A-C. Moreover, the intermediate chassis 180 may have any shape that allows the cover 200 and the lower chassis 110 to be rapidly, removably coupled to opposite sides of the intermediate chassis 180 (in any order). In other words, the intermediate chassis 180 may be any shape or size, but should maintain specific points of reference that allow a lower chassis 110 and cover 200 with the corresponding points of reference to be coupled thereto. Consequently, the intermediate chassis 180 may be able to accept alternative covers 200 (with different tolerances or designs) or alternative lower chasses 110 and allow the two components to be coupled together. This allows further end-user customization of the pool cleaner 10. That being said, in some embodiments, the pool cleaner 10 may not include an intermediate chassis 180 and various covers 200 may be attached directly to various lower chasses 110, provided that the reference points are maintained.

Figure 4:
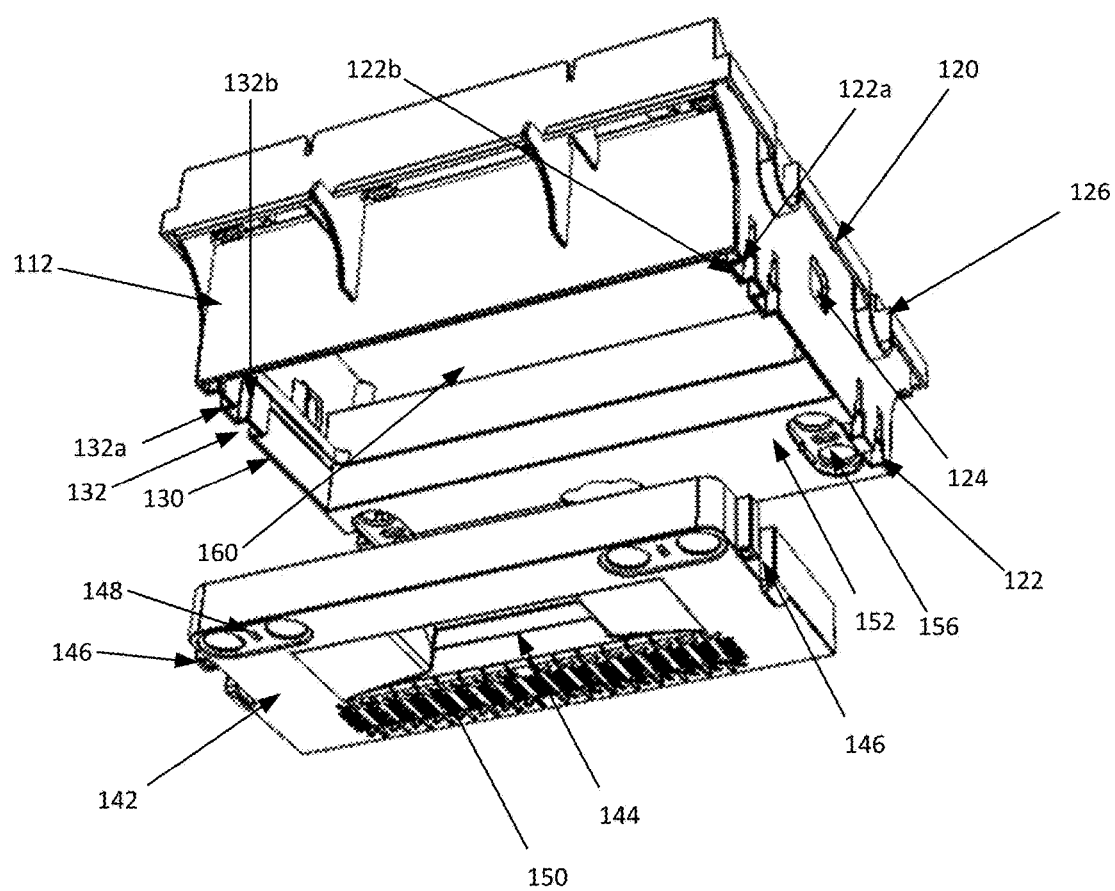
FIG. 4 is an exploded bottom perspective view of the lower chassis of the main body of the swimming pool cleaner of FIG. 1.
Figure 5:
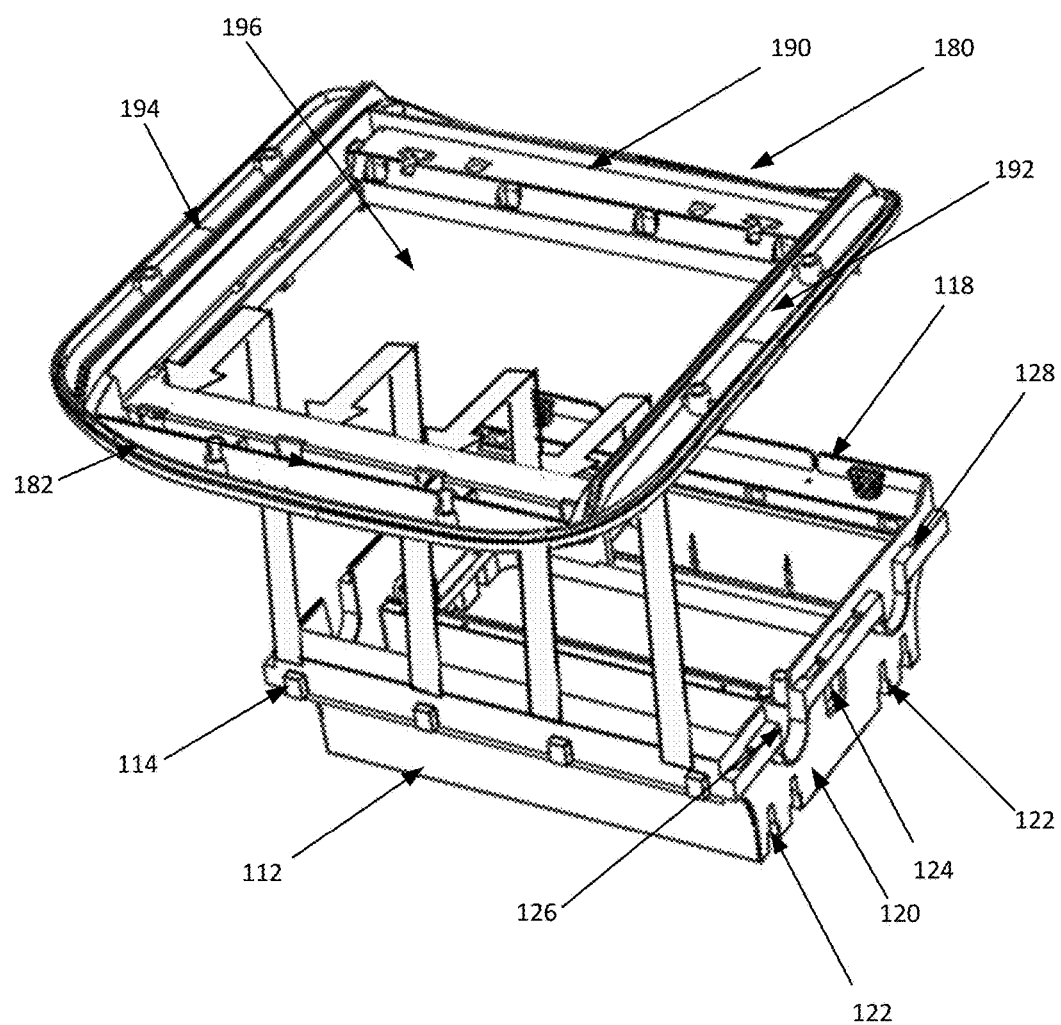
FIG. 5 is a perspective view of the lower chassis and intermediate chassis that schematically illustrates mounting the intermediate chassis on the lower chassis, according to an exemplary embodiment of the present invention.

Now referring to FIG. 4 for a description of the bottom 140 of the lower chassis 110. As mentioned, the bottom 140 includes a first section 142 and a second section 152. In this particular embodiment, the first section 142 includes a filter hole 144, various drainage holes 148, and a drainage vent 150. Additionally, the first section 142 is removable from the lower chassis 110 so that it may be replaced or switched out for another bottom section (e.g., another base plate). Since the section (or plate) 142 includes the filter opening 144 (as well as various drainage features), replacing or swapping the section 142 with another section 142 (e.g., a section 142 with a different filter opening 144) may allow new or different filters to be used with the pool cleaner 10 (since many different filters may require filter openings 144 of different sizes, shapes, and/or locations). In combination with the unobstructed interior space 160, the interchangeable first section 142 allows the pool cleaner 10 to utilize nearly any type or shape of filter (e.g., bags and boxes of different sizes).

Still referring to FIG. 4, in order to removably couple the first section 142 to the lower chassis 110, the first section 142 includes mating sections 146 that are configured to engage inner surfaces 122b and 132b of the couplers 122, 132 to removably couple the first section 142 to the sides 120, 130 of the lower chassis 110 (as is explained in further detail below, the outer surfaces 122a, 132a of the couplers 122, 132 may rapidly, removably couple a track assembly 400 to the lower chassis 110). In this particular embodiment, the mating sections 146 may snap fit into or onto the inner surfaces 122b and 132b of the couplers 122, 132; however, in other embodiments, any desirable components or features may be utilized to rapidly couple the mating sections 146 to the inner surfaces 122b and 132b of the couplers 122, 132. Moreover, although the second section 152 is formed integrally with the remainder of the chassis 110 in the depicted embodiment, the second section 152 may also be removable and/or replaceable in some embodiments. Notably, the couplers 122 and 132 that removably coupled the first section 142 to the sides 120, 130 are also disposed adjacent the second section 152 and, thus, may be easily configured to provide a rapidly removable second section 152.

Now referring to FIGS. 5 and 6A-6C for a description of an example manner of attaching the intermediate chassis 180 to the lower chassis 110. Although these figures illustrate the intermediate chassis 180 being coupled to the lower chassis, it is to be understood that, in at least some embodiments, the cover 200 may be coupled to the intermediate chassis 180 and, thus, mounted to the lower chassis 110 with the intermediate chassis 180, but in other embodiments, the cover 200 may be mounted directly to the lower chassis 110 in the same manner as illustrated for the intermediate chassis 180. That being said, in the depicted embodiment, the intermediate chassis 180 is coupled to the lower chassis by aligning the sides 192 and 194 with the respective sides 120 and 130 of the lower chassis 110 and then sliding or shifting the intermediate chassis 180 into complete alignment with the lower chassis 110. In some embodiments, this shifting or sliding may cause locking elements on various portions of the main body 100 to engage and interlock, thereby securing the intermediate chassis 180 and/or cover 200 to the lower chassis 110. However, in other embodiments, the portions of the main body 100 may be coupled together in any rapidly releasable (by an end-user) manner.

Figure 6A:
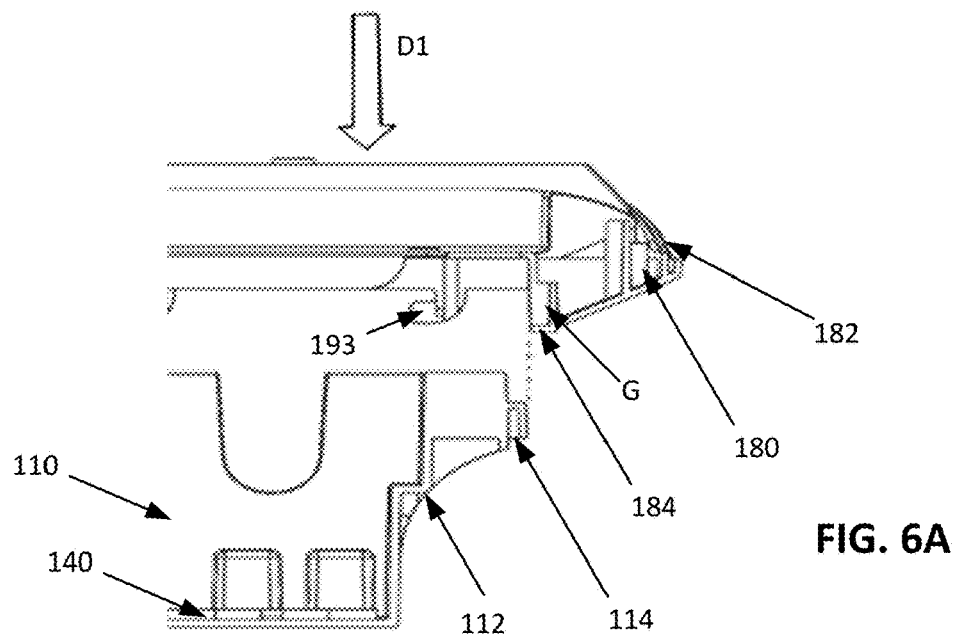
FIGS. 6A-6C are sectional side views of the lower chassis and intermediate chassis that schematically illustrate mounting the intermediate chassis on the lower chassis, according to an exemplary embodiment of the present invention.
Figure 6B:
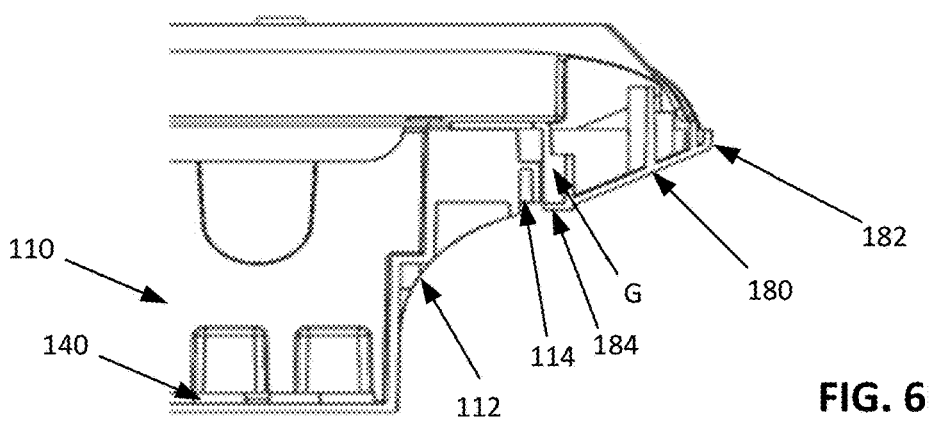
Figure 6C:
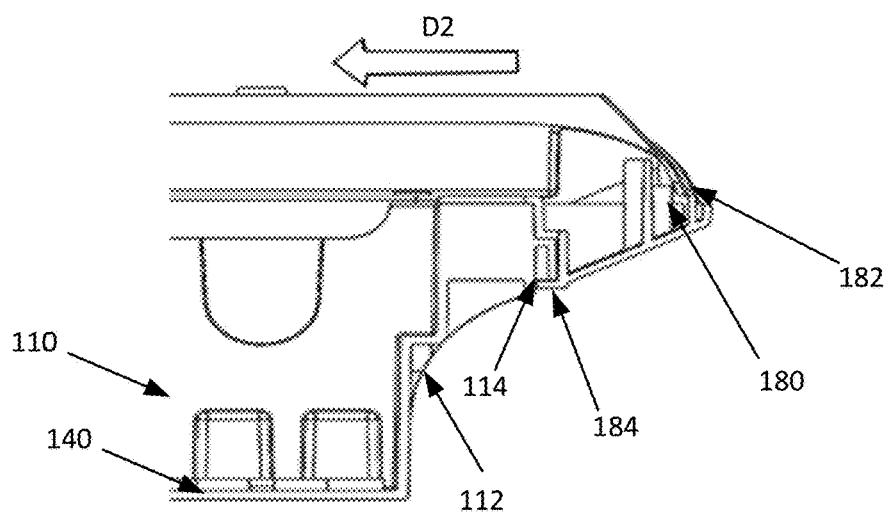

In the particular embodiment depicted in FIGS. 5 and 6A-C (which show a perspective view and cross-section views, respectively, of how the intermediate chassis or adapter piece 180 may be mounted on the lower chassis 110), the intermediate chassis 180 and lower chassis 110 are laterally aligned (e.g., in the x-direction), but offset in the z-direction (e.g., the front and back are offset), and moved vertically together (e.g., in the y-direction). For example, the intermediate chassis 180 may be moved downwards (see arrow D1 in FIG. 6A) onto the lower chassis 110 while the front end 182 and rear end 190 are offset from the front end 112 and rear end 118 of the lower chassis 110. This movement begins to align locking elements 114 provided on the front end 112 of the lower chassis 110 with protuberances 184 included on the front end 182 of the intermediate chassis 180. As shown in FIG. 6B, once the intermediate chassis 180 is resting atop of the lower chassis 110, the intermediate chassis 180 is not yet locked to the lower chassis 110. Instead, a gap G exists between protuberances 184 and their corresponding locking element 114. Then, the intermediate chassis 180 is shifted rearwards (see arrow D2 in FIG. 6C) to eliminate the gap G, lock the protuberances 184 around the locking elements 114, and lock the intermediate chassis 180 in place on the lower chassis 110 to prevent the intermediate chassis 180 from lifting or moving upwards, away from the lower chassis 110.

In addition to or as an alternative to removably coupling the protuberances 184 to the locking elements 114, a similar locking process may occur on the sides of the lower chassis 110 and the intermediate chassis 180. As best illustrated in FIG. 3, the intermediate chassis 180 (or the upper chassis 200) may include hook or L-shaped protrusions 193 that may be configured to engage chassis openings 128 included on side 120 and side 130 of the lower chassis. Similar to the protuberances 184, the protrusions 193 may engage the chassis openings 128 when the sides 192, 194 of the intermediate chassis 180 are aligned with the sides 120, 130 of the lower chassis 110 and may be locked therein when the intermediate chassis 180 is shifted in the z-direction with respect to the lower chassis 110 (e.g., shifted forward). In FIG. 3, both the cover 200 and intermediate chassis 180 are shown including the protrusions 193; however, typically, only the cover 200 or the intermediate chassis 180 includes the protrusions 193, since only one of these components may be able to be coupled directly to the lower chassis 110 at any one time. Alternatively, the intermediate chassis 180 may include openings configured to receive protrusions 193 included on the cover and the protrusions 193 included on the intermediate chassis 180 may engage the chassis openings 128.

Figure 7A:
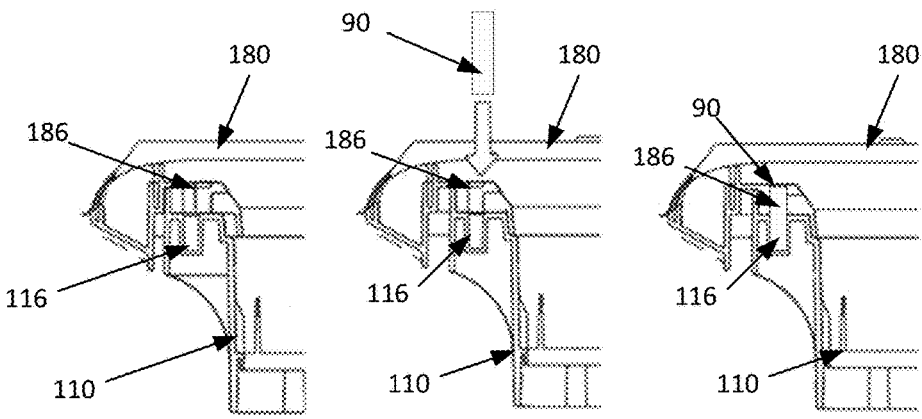
FIG. 7A provides sectional side views of the lower chassis and intermediate chassis that schematically illustrate mounting the intermediate chassis on the lower chassis, according to an exemplary embodiment of the present invention.
Figure 7B:
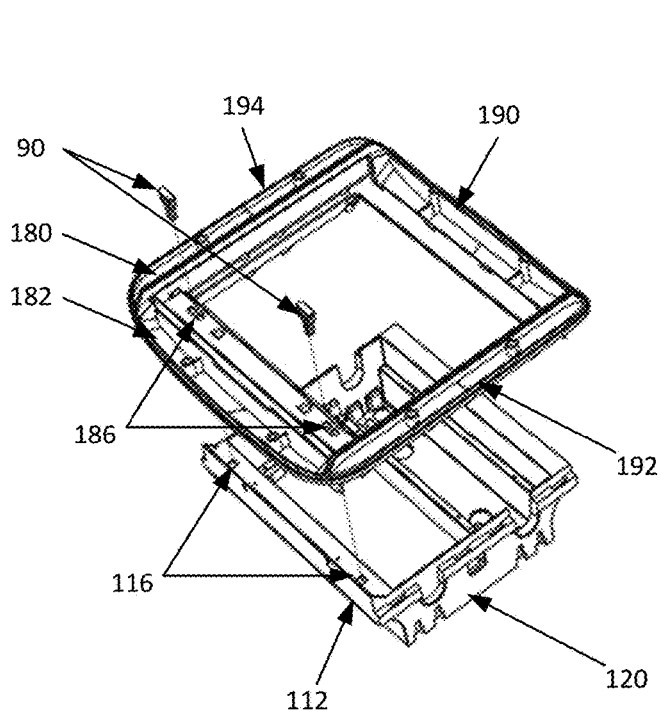
FIG. 7B is a top perspective view of the lower chassis and intermediate chassis that schematically illustrate mounting the intermediate chassis on the lower chassis in the manner illustrated in FIG. 7A.
Figure 7C:
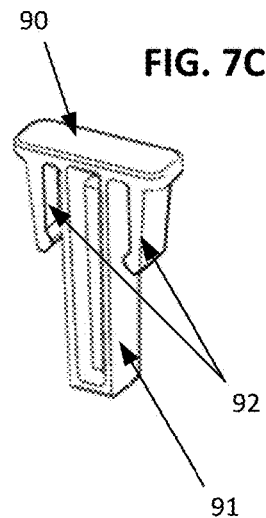
FIG. 7C is a front perspective view of a locking pin utilized in FIGS. 7A and 7B.

Generally, the intermediate chassis 180 and/or the upper chassis 200 may be rapidly, removably coupled to the lower chassis 110 in any manner that allows the various chassis portions to be assembled into main body 100 and disassembled into individual components quickly by an end-user and preferably without tools. As one further example, one or more locking pins 90 could alternatively or additionally be used to reinforce the locking between the intermediate chassis 180 and the lower chassis 110, as is shown in FIGS. 7A-C. The locking pin 90 is illustrated best in FIG. 7C, and includes a main body 91 and two resilient wing elements 92. The main body 91 is insertable into holes 116 provided therefor in the lower chassis 110 and the two resilient wing elements 92 that are insertable in holes 186 provided therefor in the intermediate chassis 180. Preferably, the locking pins 90 are secured within the holes 186 and 116 due to resiliency of the wing elements 92 and, thus, can be installed by an end-user, and without tools. This is illustrated in the sectional views of FIG. 7A, which show, from left to right: the intermediate chassis 180 and lower chassis 110 aligned without a locking pin 90 (e.g., after locking protrusions 193 into chassis openings 128 and/or protuberances 184 around locking elements 114); the locking pin 90 before being inserted; and the locking pin 90 inserted in the through-hole 186 of the intermediate chassis 180 and the hole 116 of the lower chassis 110.

Figure 8B:
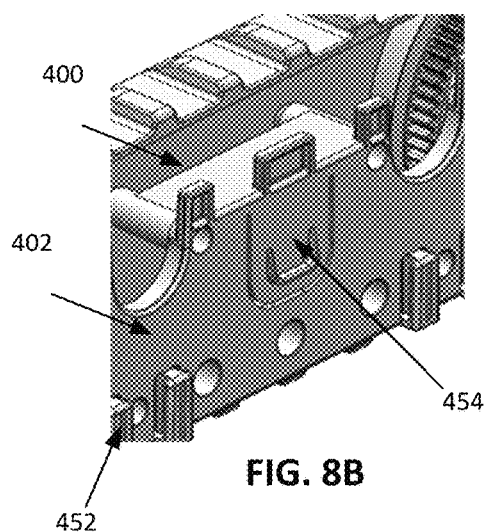
FIGS. 8A-C are side perspective views of the main body and a first drive assembly of the swimming pool cleaner of FIG. 1 and, collectively, FIGS. 8A-C schematically illustrate mounting a drive assembly on the main body, according to an exemplary embodiment of the present invention.
Figure 8C:
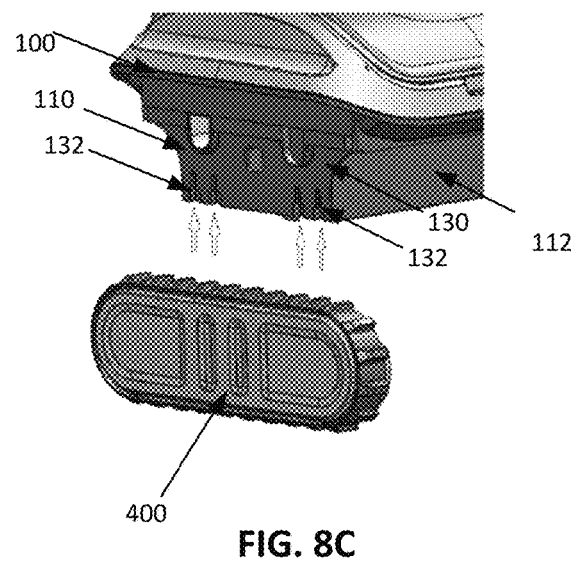
Figure 8A:
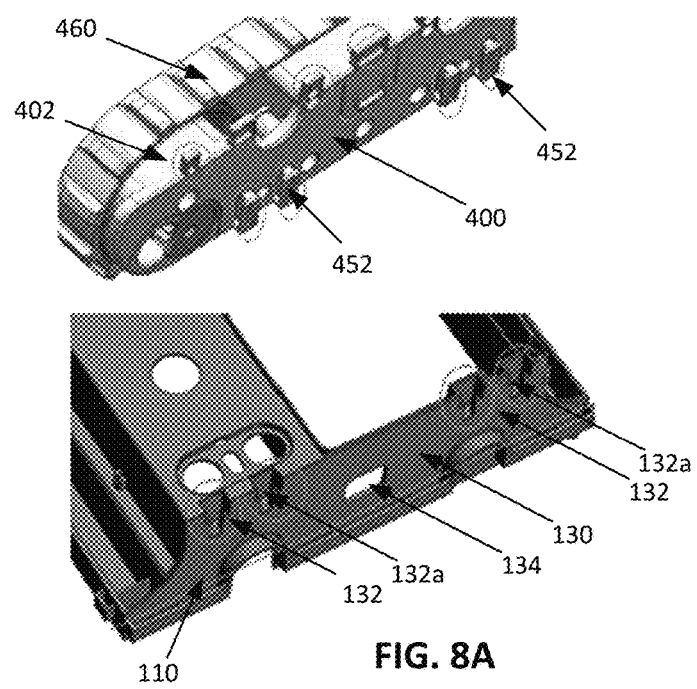

Now referring to FIGS. 8A-C for a description of how the drive assemblies 400 may be mounted to the main body 100 according to an exemplary embodiment of the present invention. Although FIGS. 8A-C only show one drive assembly 400 being mounted to the main body 100, it is to be understood that the description of this mounting applies to both drive assemblies 400 since, as is explained in further detail below, each drive assembly 400 is substantially the same (and could be identical). Generally, a drive assembly 400 may be rapidly, removably coupled to the main body 100 without disassembling or rearranging any other parts or assemblies included in the pool cleaner 10. Consequently, if a drive assembly 400 requires maintenance, repair, or replacement, the drive assembly 400 can be easily removed and fixed by an end-user.

More specifically, a drive assembly 400 may be coupled to the main body 100 by engaging the drive assembly 400 with the outer surfaces 122a, 132a of couplers 122 or 132 and the opening 124 or 134 included on a side 120 or 132 of the lower chassis 110. In order to engage the couplers 122 or 132, the drive assembly 400 includes clasps 452 configured to slide vertically into slots created by the outer surface 122a or 132a or the couplers 122 or 132. In this particular embodiment, each drive assembly 400 includes four clasps 452, arranged in two pairs (to match the arrangement of couplers 122, 132 included on the lower chassis 110); but in other embodiments any desirable arrangement may be utilized.

Once the clasps 452 have been inserted into the outer surfaces 122a, 132a of the couplers 122 or 132, as is illustrated in FIGS. 8A and 8C (with FIG. 8A illustrating the lower chassis 110 upside down and not properly aligned with the drive assembly 400, for illustrative purposes), the drive assembly 400 may be pressed against the lower chassis 110 to engage a detent 454 with the opening 124, 134 and create a snap engagement between the drive assembly 400 and the lower chassis 110. Thus, the clasps 452 and couplers 122, 132 may secure the drive assemblies 400 to the lower chassis 110 with respect to two directions (e.g., the x-direction and the z-direction) and the detent 454 and opening 124, 134 may secure the drive assemblies 400 to the lower chassis 110 with respect to a third direction (e.g., vertically, or with respect to the y-axis). Since the detent 454 only resists a certain amount of force, the drive assemblies 400 may be detached from the main body 100 by pulling the drive assembly laterally away from the main body 100 with a sufficient force to disengage the detent 454 from the opening 124, 134. Then, the drive assembly 400 may be slid downwards (or upwards if the pool cleaner 10 is upside down) by the end-user to remove the clasps 452 from the couplers 122, 132 and rapidly decouple the drive assembly 400 from the main body 100 (without tools).

In other embodiments, the detent 454 could be provided on the lower chassis 110 and an opening equivalent to openings 132 and 134 could be included on the drive assembly 400. Similarly, in other embodiments, the clasps 452 could be included on the lower chassis 110 and the drive assemblies 400 could include openings/couplers configured to receive the clasps. Still further, in other embodiments, the drive assemblies 400 may not include any clasps or detents and may be coupled to the lower chassis in any manner that allows for rapid, removable coupling, such that the drive assemblies 400 can be quickly removed from the main body 100 by an end-user and without tools.

Figure 9:
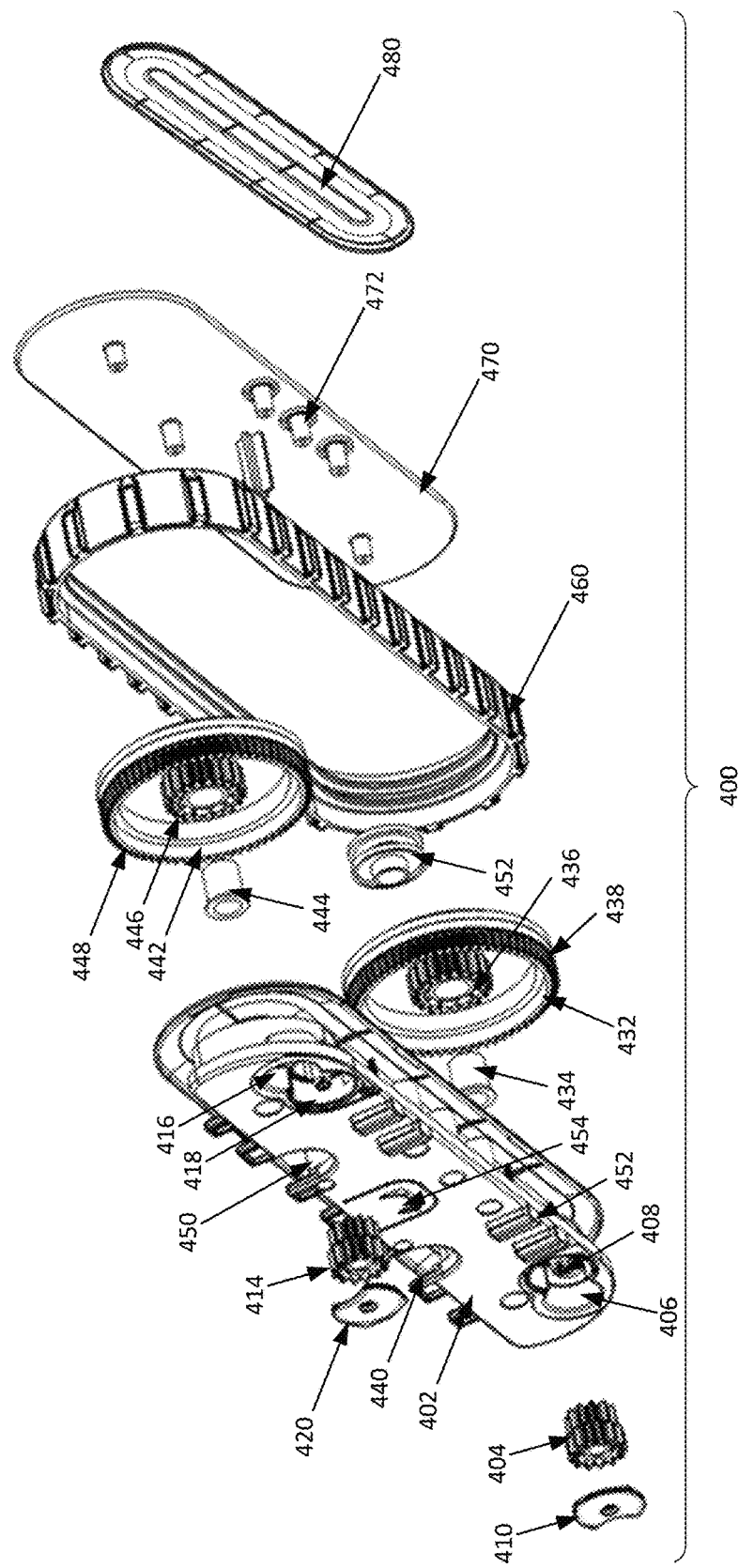
FIG. 9 is an exploded, side perspective view of a drive assembly of the swimming pool cleaner of FIG. 1, according to an exemplary embodiment.

Now referring to FIG. 9 for a description of a drive assembly 400 according to an exemplary embodiment of the present invention. As mentioned above, although the pool cleaner 10 may include multiple (e.g., two) drive assemblies 400, each drive assembly 400 is substantially the same. Consequently, in order to work on either side of the pool cleaner 10, each drive assembly 400 is substantially symmetrical, insofar as any critical features are included on each end of the drive assembly. For example, in the embodiment depicted in the Figures, the detent 454 may be substantially centered on the drive assembly 400 and features included on the drive assembly 400 may be mirrored about the detent 454.

Generally, each drive assembly 400 includes a number of gears that are configured to drive an endless track or belt 460. The endless track 460 may then engage and rotate against a surface of a pool to drive the pool cleaner 10 along the surface of the pool. An endless track 460 may provide sufficient power and grip to traverse various surfaces; however, in other embodiments, any combination of wheels, tracks, or other such driving elements may be included in drive assemblies 400 to drive or propel the pool cleaner 10 along a pool surface.

In the depicted embodiment, each drive assembly 400 may include a housing 402 that houses a number of gears configured to impart rotation from a motor included in the motor assembly 300 to an endless track 460 disposed around the housing 402 as well as any brush assemblies 500 included in the robot. More specifically, housing 402 may house a first drive gear 432 and a second drive gear 442, as well as a first idler gear 404 associated with the first drive gear 432 and a second idler gear 414 associated with the second drive gear 442. The housing 402 may include openings 440 and 450 that are configured to provide access to drive gear 432 and drive gear 442, so that at least one of drive gear 432 and drive gear 442 may be driven by a motor included in the motor assembly 300, as is explained in further detail below.

Meanwhile, idler gear 404 and idler gear 414 may be operatively coupled to drive gear 432 and drive gear 442, respectively, and may also be configured to drive brush assemblies 500 included in the pool cleaner 10. Thus, the housing 402 may include an opening 406 disposed adjacent an idler housing 408 for idler gear 404 and an opening 416 disposed adjacent an idler housing 418 for idler gear 414. However, idler gear 404 and idler gear 414 may each be selectively removable from the housing 402 to reconfigure the drive train, as is described in further detail below and, thus, may be secured within an idler housing 408 and 418, respectively, by rapidly removable covers 410 and 420, respectively.

As can be seen in the exploded view provided in FIG. 9, drive gears 432 and 442 each include external teeth 438 and 448 and internal teeth 436 and 446, respectively. The external teeth 438 and internal teeth 436 included on the first drive gear 432 are both centered around an axle 434 while the external teeth 448 and internal teeth 446 included on the second drive gear 442 are both centered around an axle 444. Thus both sets of teeth on a particular drive gear 432, 442 are driven through the same rotation when motion is imparted to the drive gear via one of the sets of teeth. Consequently, as is explained in further detail below in connection with FIGS. 12A-B and 13A-B, when the outer teeth are driven by a motor, the inner teeth may impart the same rotation to brush assemblies 500 included in the pool cleaner 10 (via an idler gear, if the idler is installed therein).

It should be noted that the gears included in the housing 402 (e.g., gears 404, 414, 432, and 442) may be exposed at their respective opening (e.g., opening 406, 416, 440, and 450), but otherwise sealed within housing 402. Then, the openings can be sealed by corresponding components in order to completely seal the gears within housing 402 and protect the gears from debris (including debris floating in the water). For example, idler gears 404 and 414 may be sealed within the housing 402 by covers 410 and 420, respectively, so that the idler gears 404 and 414 are only laterally exposed (on an outer edge) within the housing 402 at openings 406 and 416. Then, when a brush assembly 500 is inserted into opening 406 or opening 416, the brush assembly 500 may completely seal idler gear 404 within housing 408 or idler gear 414 within housing 418 in order to prevent debris from entering the gears. However, as is discussed in further detail below, covers 410 and 420 may each be rapidly, removably coupled to the housing 402 in order to allow idler gear 404 or idler gear 414 to be selectively removed from the housing 402 by an end-user and enable different drive configurations.

Figure 10A:
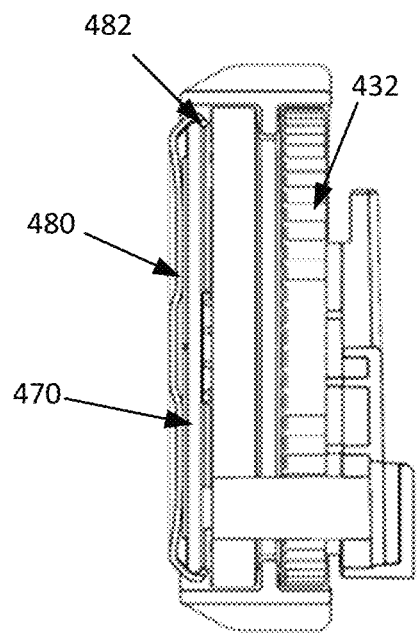
FIGS. 10A and 10B are sectional views of the drive assembly of FIG. 9.
Figure 10B:
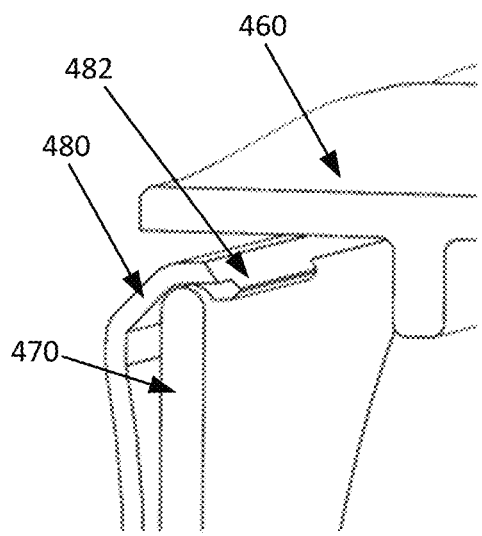

Now referring to FIGS. 10A and 10B, but with continued reference to FIG. 9, in order to further seal the gears of a drive assembly 400 within the housing 402 (and prevent debris from entering the gear teeth), a track plate 470 may be sealed or coupled to an outer face of the housing 402. In order to hide this track plate 470, which may have a plain appearance, and to allow end-users to customize the look of the drive assemblies, the drive assembly 400 may also include detachable trim or track plate cover 480. The trim 480 may improve the external appearance of the track assembly 400 (by providing a wide variety of different aesthetic indicia thereon) and may be easily manufactured with simpler molds, as compared to the track plate 470. For example, the trim 480 may be a substantially flat plate with attachment tabs 482 while the track plate 470 may include engagement portions 472 configured to extend through housing 402 and secure the track plate 470 thereto. As can be seen in FIGS. 10A and 10B, the attachment tabs 482 may flex around the track plate 470 (between the track plate 470 and the endless track 460) and resiliently, removably couple the trim 480 to the track plates 470.

Figure 11:
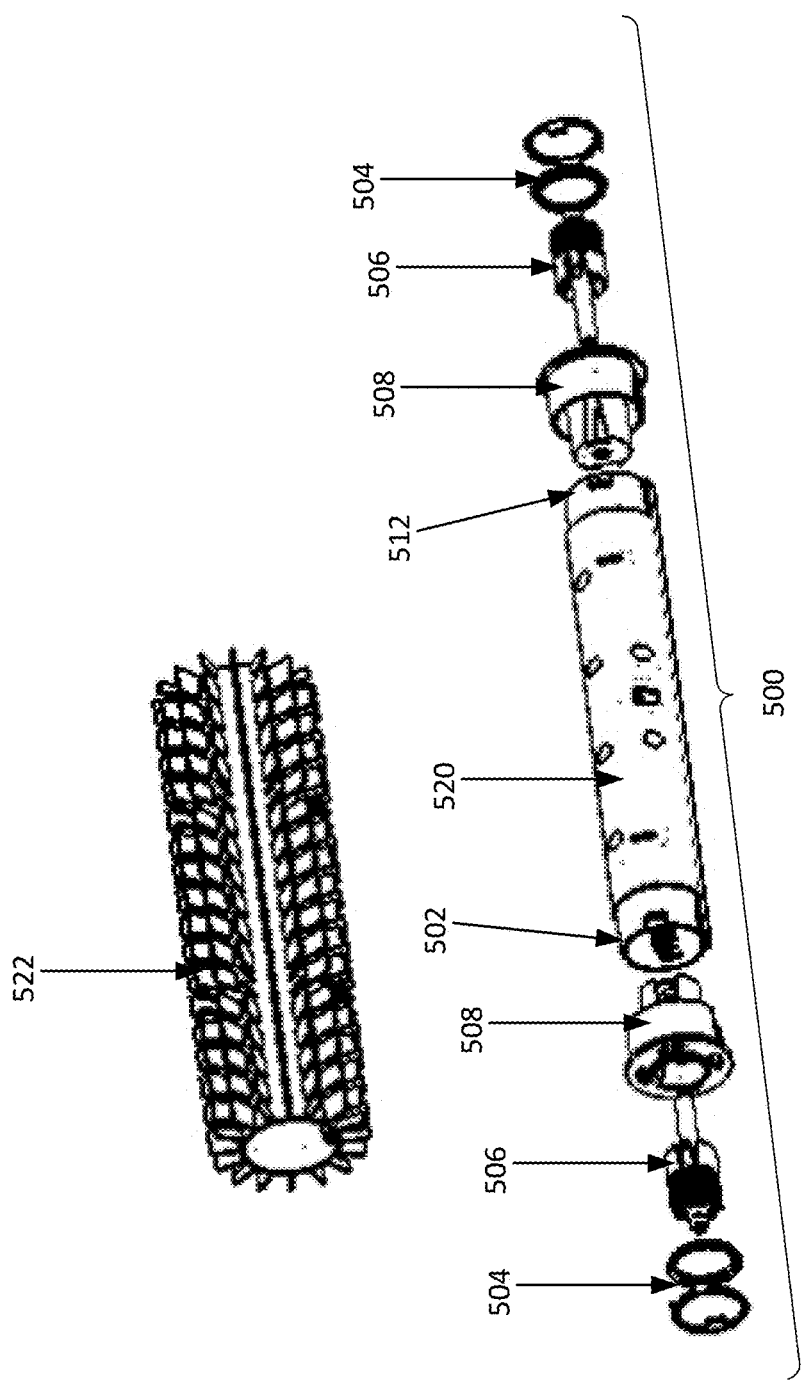
FIG. 11 is an exploded, front perspective view of a brush assembly of the swimming pool cleaner of FIG. 1, according to an exemplary embodiment.

Now referring to FIG. 11 for a description of a brush assembly 500 that may be included in the pool cleaner 10, according to an exemplary embodiment of the present invention. The brush assembly 500 includes an elongate member 520 with a first end 502 and a second end 512. The elongate member 520 may include any number of indentations, crevices, openings, or protrusions to allow a brush member 522 to be secured therearound and may also include any desirable locking or engagement elements at its first end 502 and second end 512 to secure additional parts thereto. However, preferably, the brush assembly 500 is symmetrical so that the brush assembly may be used as a front brush and a rear brush for the pool cleaner and may be installed in either orientation (e.g., with the first end 502 being installed within a drive assembly 400 installed on the first side 120 or the second side 130 of the lower chassis 110).

Generally, the brush assembly 500 extends between two drive assemblies 400, with the first end 502 installed in (e.g., rapidly, removably coupled to) a first drive assembly 400 and the second end 512 installed in (e.g., rapidly, removably coupled to) a second drive assembly 400. More specifically, the first end 502 and the second end 512 may each include a resilient coupling assembly 508 that is biased to an outwards position. In other words, the coupling assembly 508 may be spring loaded so that the first end 502 (or second end 512) can be pushed laterally inwards by an end-user while being coupled to a drive assembly 400 until the second end 512 (or first end 502) is properly aligned with another drive assembly 400. Then, upon releasing the inward force (the push), the coupling assemblies 508 may extend laterally outwards into their respective drive assemblies 400 to secure the brush 500 between two drive assemblies 400. Put simply, the brush assembly 500 may be installed like a tension rod is installed between two walls (for example, a spring loaded tension rod, like those used in a bathroom for a shower curtain, which are generally twisted to lock between the walls). Consequently, the brush assemblies 500 may be easily installed into or removed from the pool cleaner 10 by an end-user (preferably, but not necessarily, once the drive assemblies 400 are secured to the main body 100).

Figure 12A:
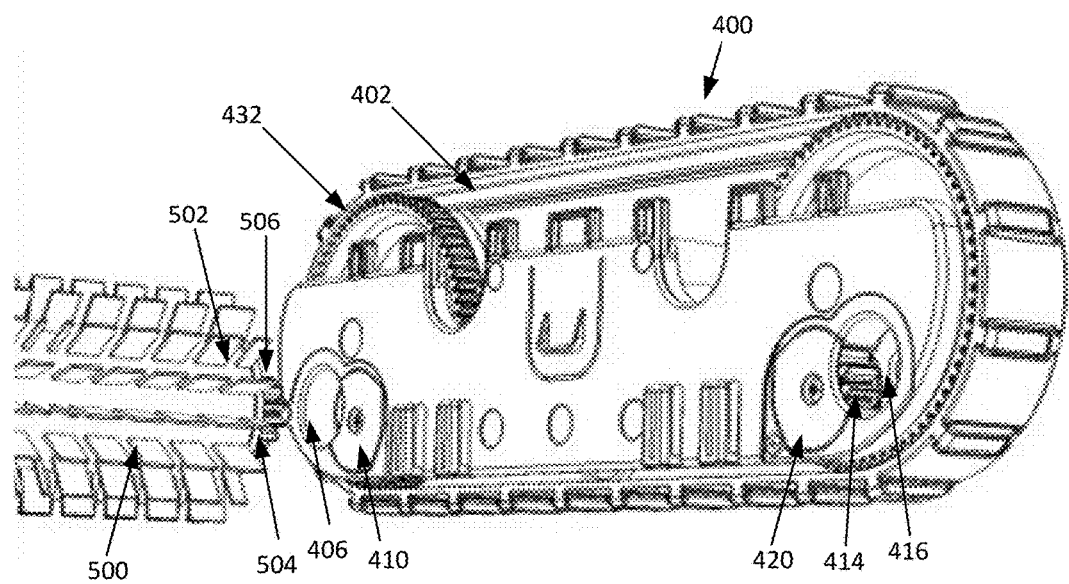
FIGS. 12A and 12B are side perspective views of the drive assembly of FIG. 9 and portions of the brush assembly of FIG. 1 and, collectively FIGS. 12A and 12B schematically illustrate coupling the brush assembly to the drive assembly, according to an exemplary embodiment of the present invention.
Figure 12B:
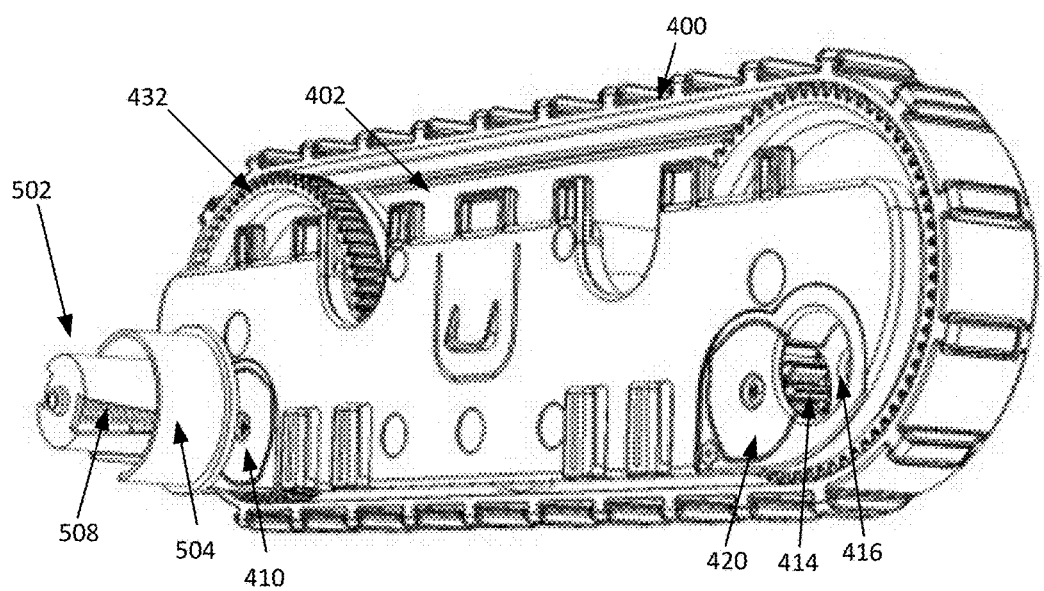

Still referring to FIG. 11, but now with reference to FIGS. 12A and 12B as well, the first end 502 and the second end 512 may each also include a brush gear 506 (insofar as 'brush' indicates that gear 506 is part of the brush assembly 500, not a specific type of gear) configured to engage an idler gear included in a drive assembly 400 and a lip seal 504 configured to seal an opening that may receive the brush gear 506. For example, the brush gears 506 may be inserted into the openings 406 and/or 416 that are adjacent the idler gears 404 and 414, respectively, and the lip seals 504 may seal openings 406 and/or 416. In FIG. 12A, a brush assembly is shown being inserted into opening 406 so that the brush gear 506 may engage the idler gear 404 (not shown in FIG. 12A) installed within housing 408 (also not shown in FIG. 12A, since housing 408 is covered by cover 410 in this view).

Once the brush gear 506 is installed in the opening 406, the brush gear 506 may engage the portion of the idler gear 404 that is exposed in opening 406 and, thus, may allow the drive gear 432 to impart rotational motion to the brush 500 when the drive gear 432 drives (e.g., imparts rotation to) the idler gear 404. Moreover, once the brush gear 506 is installed within opening 406, the lip seal 504 may completely seal opening 406, as is illustrated by FIG. 12B, so that the idler gear 404 is completely sealed within the housing 402 and shielded from debris (e.g., not exposed to debris). Although a brush assembly 500 is not shown installed within and sealing opening 416, it is to be understood that the process described above with respect to opening 406 and idler gear 404 may also apply to opening 416 and idler gear 414.

Figure 13A:
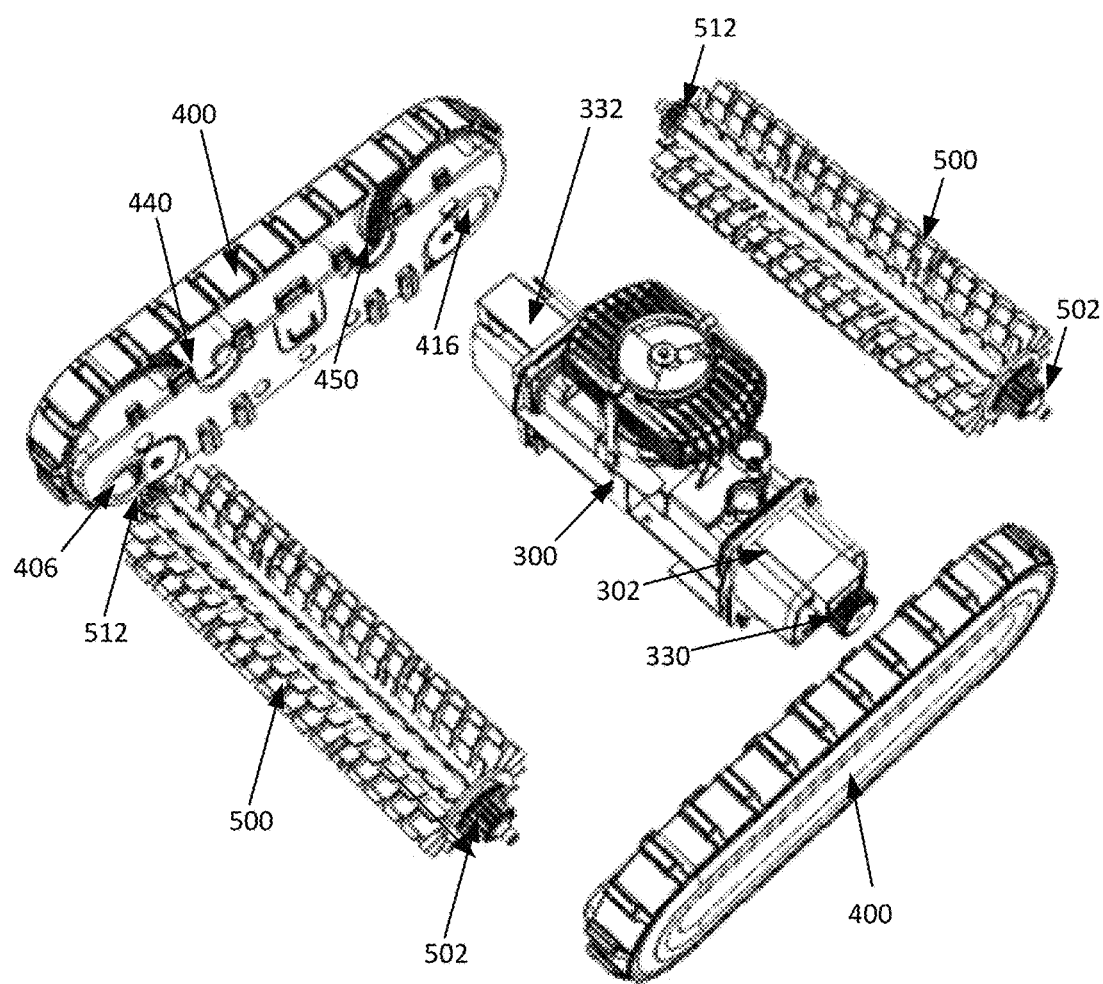
FIGS. 13A and 13B show an exploded view and top, sectional perspective view, respectively, of the drive assemblies, brush assemblies and motor assembly of the swimming pool cleaner of FIG. 1 to illustrate a drive train of the swimming pool cleaner of FIG. 1.
Figure 13B:
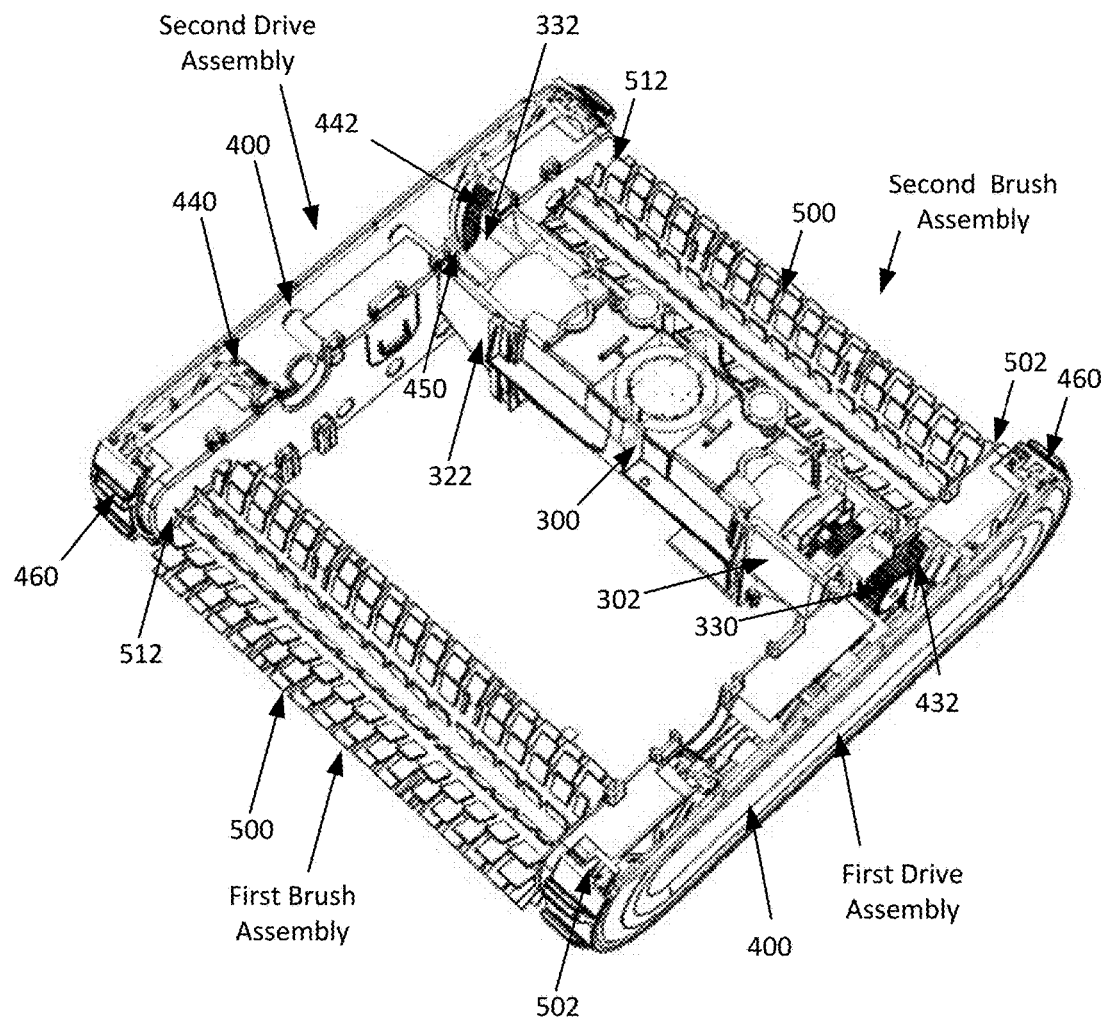

In FIGS. 13A and 13B, the engagement of the brush assemblies 500 with the drive assemblies 400 and the motor assembly 300 is illustrated in order to illustrate the drive path or power train of the components included in the pool cleaner 10. FIG. 13A shows the various assemblies in a partially exploded view, just prior to engagement and FIG. 13B shows a partial sectional view of the assemblies once rapidly, removably coupled together to illustrate where certain gears or components are disposed when these assemblies are rapidly, removably coupled together. As can be seen, the brush assemblies 500 and motor assembly 300 each extend between the two drive assemblies 400 (the motor assembly 300 being disposed within the main body 100, which is not shown for clarity) so that motor assembly 300 may impart motion to the drive assemblies 400 and the brush assemblies 500. Additionally or alternatively, the drive assemblies may impart motion to or through the brush assemblies 500 (e.g., one drive assembly 400 may impart motion to the other drive assembly 400 through at least one of the brush assemblies 500).

In the particular embodiment depicted in the Figures, the motor assembly 300, which is described below in further detail, includes a first end 302 configured to engage a first drive assembly 400 (e.g., the lower drive assembly 400 shown in FIGS. 13A and 13B) and a second end 332 configured to engage a second drive assembly 400 (e.g., the uppermost drive assembly 400 shown in FIGS. 13A and 13B), but, in this particular embodiment, only the first end 302 includes a motor with a propulsion gear 330. Moreover, in the depicted embodiment, the motor assembly 300 is disposed adjacent a second brush assembly 500 (shown in the upper right portion of FIGS. 13A and 13B) so that the propulsion gear 330 (which is driven by a motor included in the first end 302 of the motor assembly 300) is configured to engage drive gear 432 included in the first drive assembly 400 (the two drive assemblies 400 are the same, so the drive gear 432 is disposed at the front end of the second drive assembly 400, despite being disposed at the rear end of the first drive assembly 400).

Still referring to FIGS. 13A and 13B, but now with reference to FIGS. 9, 12A, and 12B as well, when the propulsion gear 330 drives the drive gear 432 included in the first drive assembly 400, the drive gear 432 rotates the endless track 460 on the first drive assembly 400 (via the external teeth 438). As the endless track 460 on the first drive assembly 400 rotates, the endless track 460 may rotate the drive gear disposed adjacent the front brush assembly 500 (drive gear 442). As is described in further detail below, in some embodiments, the motor housing 300 may include another motor configured to drive the endless track 460 included on the second drive assembly 400 in a similar manner. However, in embodiments with a single motor, such as the depicted embodiment, the first drive assembly 400 and second assembly 400 must include at least one pair of corresponding idler gears in order to drive the second drive assembly 400. For example, the first drive assembly may include idler gear 404 and the second drive assembly 400 may include idler gear 414, or vice versa. The at least one pair of corresponding idler gears ensures that the second drive assembly 400 is driven (through at least one brush assembly 500) by a single motor included in the motor assembly 300, while the location of the at least one pair of corresponding idler gears may determine whether the front brush assembly 500, the rear brush assembly 500, or both of the brush assemblies 500 are driven.

More specifically, if the first drive assembly 400 includes idler gear 404 the second drive assembly 400 should include idler gear 414 to impart power to the second drive assembly 400 via movement of the second brush assembly 500. With this configuration, rotation of the drive gear 432 may also rotate the idler gear 404 (which is operationally coupled to the drive gear 432 via internal teeth 436). The idler gear 404 then rotates the second brush assembly 500 (via a brush gear 506 at the first end 502), which may rotate the idler gear 414 in the second drive assembly 400 (via a brush gear 506 at the second end 512). Rotation of idler gear 414 may, in turn, rotate the drive gear 442 included in the second drive assembly 400 (via internal teeth 446), which may rotate the endless track 460 included on the second drive assembly (via external teeth 448). In other words, the second brush assembly 500 may be powered and may impart rotational motion to the second drive assembly. If the first drive assembly 400 also includes idler gear 414 and/or the second drive assembly also includes idler gear 404, the first brush assembly 500 may also be powered when motion is imparted (by an endless track 460) to the drive gears adjacent the first brush assembly 500 (drive gear 442 on the first drive assembly 400 and drive gear 432 on the second drive assembly). If not, the first brush assembly 500 may rotate freely or passively.

By comparison, if the motor assembly 300 only includes a single motor, the first drive assembly only includes idler gear 414, and the second drive assembly 400 only includes idler gear 404 (e.g., the idlers adjacent the first brush assembly 500), imparting motion to drive gear 432 may only cause the first brush assembly 500 to rotate while the second brush assembly 500 rotates freely or passively. Put another way, when the pool cleaner 10 includes a single motor assembly 300 with a single drive motor, the drive assemblies 400 can be easily reconfigured to provide one powered brush assembly 500 at either end of the pool cleaner or two powered brush assemblies 500. Consequently, the pool cleaner may include powered front or rear brush assemblies, regardless of which end of the pool cleaner 10 is currently defined as the front.

Moreover, as mentioned, the pool cleaner 10 may be further reconfigured by moving the motor assembly to a different location (e.g., adjacent the first brush assembly 500), by including additional motors in the motor assembly 300, and/or by incorporating an additional motor assembly 300 into the pool cleaner 10. For example, if desired, a second motor assembly 300 may be incorporated into the pool cleaner 10 and the two motor assemblies 300 may simultaneously engage the same drive assembly via the two openings 440 and 450 included adjacent the two drive gears 432 and 442, respectively. Additionally or alternatively, a second motor may be incorporated into the first motor assembly 300 (at end 322). In embodiments that include a motor assembly 300 with two motors, a first motor (e.g., at end 302) may operate (e.g., rotate) the first drive assembly 400 and a second motor (e.g., at end 322) may operate (e.g., rotate) the second drive assembly 400. Then, the pool cleaner 10 can be steered by differential operation of the individual motors.

However, when different motors are operating different drive assemblies 400, it may be necessary to remove certain idler gears 404, 414 to prevent jams or other mechanical issues (e.g., binding) that might come about if the two motors impart counteracting forces on the same assembly. For example, the idler gears 404, 414 could be manipulated so that the first motor and second motor do not power the same brush assembly 500. Any combination of idler gears 404, 414 can be removed by an end-user to achieve this in any manner. For example, each drive assembly 400 may be configured to only include idler gear 414 so that the first motor operates the first brush assembly 500 while the second motor operates the second brush assembly 500 without imparting a force through either brush assembly to the other drive assembly 400 (since neither drive assembly includes idler gear 404). Alternatively, one drive assembly might include idler gear 404 and idler gear 414 while the other drive assembly does not include any idlers (e.g., idler gears 404 and 414 are removed). In these situations, the customizable trim 480 may be used to mark or identify the idler gears 404, 414 included in a particular drive assembly 400.

Now turning to FIGS. 14, 15A-B, 16, and 17 for a description of the motor assembly 300 in accordance with an exemplary embodiment of the present invention. As previously alluded to, the motor assembly 300 is modular and reconfigurable so that multiple motor configurations can interchangeably be included in the pool cleaner 10. In particular, the motor assembly 300 includes a central section 340 with a first receiver 342 and a second receiver 344 that are configured to receive modular end sections (also referred to herein as ends). The first receiver 342 is configured to receive a first end 302 and the second receiver 344 is configured to receive a second end 322. However, receivers 342 and 344 are substantially the same and, thus, the receivers are actually configured to receive end 302 or end 322, as well as any other ends with the same reference points. Consequently, the motor assembly 300 allows for different types/sizes of motor, as well as any other component, to be assembled within the motor module, only subject to the space constraints within the pool cleaner 10. For example, an air tight bladder or battery could be connected to one of the receivers 342, 344 in order to provide additional ballast or power, respectively, within the pool cleaner 10. Advantageously, if a ballast component is included in the motor assembly, the pool cleaner 10 may not need to include foam or some other typically included flotation inducing substance that erodes or wears over time. That being said, preferably, the first end 302 and the second end 322 may have similar weights so that the pool cleaner 10 is properly balanced (e.g., with a center of gravity laterally centered in the pool cleaner).

Regardless of what is housed in the ends 302, 322, in at least some embodiments, end 302 and end 322 may each be rapidly, removably coupled to the central section 340. For example, the ends 302, 322 may each include a detent that snaps into a portion of the central section 340. Moreover, collectively, end 302, end 322, and central section 340 may be sized to sit substantially within the interior space 160 provided by the main body 100 and extend laterally thereacross. For example, end 302 and end 322 of the housing 300 may each sit within the receivers 126 provided in the lower chassis 110.

In this particular embodiment, the first end 302 defines a cavity 304 and provides a lateral opening 308. By comparison, the second end 322 defines a cavity with a closed end 328. The second end 328 may be empty and may simply balance the weight of the motor assembly 300 and/or house an air (or other type of) ballast for buoyancy, or any other type of buoyancy control mechanism. Meanwhile, the cavity 304 may house a motor that extends laterally out of the lateral opening 308 to engage a drive gear included in a drive assembly 400. In order to accommodate various motors, such as motor types 40a, 40b, the first end 302 may also include a motor adapter plate 45 (more clearly visible in the exploded views of FIGS. 15A and 15B), configured to define a pre-established space within cavity 304. The various motor types may power a gear train 46 included on an opposite side of the motor plate 45 which, in turn drives the propulsion gear that is configured to engage and impart motion to at least one drive assembly 400.

In some embodiments, ends 302 and 322 may be manufactured together with the central section 340 and/or sealed to section 340 to form one water tight motor assembly 300. However, in other embodiments, each of the central section 340, the end 302, and the end 322 may be individually sealed and water tight. Consequently, in some embodiments, an end (e.g., end 302 or end 322) may be manufactured separately from the central section 340 (as well as other components of the motor assembly 300) and subsequently assembled. This may allow the ends to be manufactured by specific manufacturers well-versed with water-tight component manufacture if desired. This may allow flexibility in pre-fabricated parts inventories.

Figure 16:
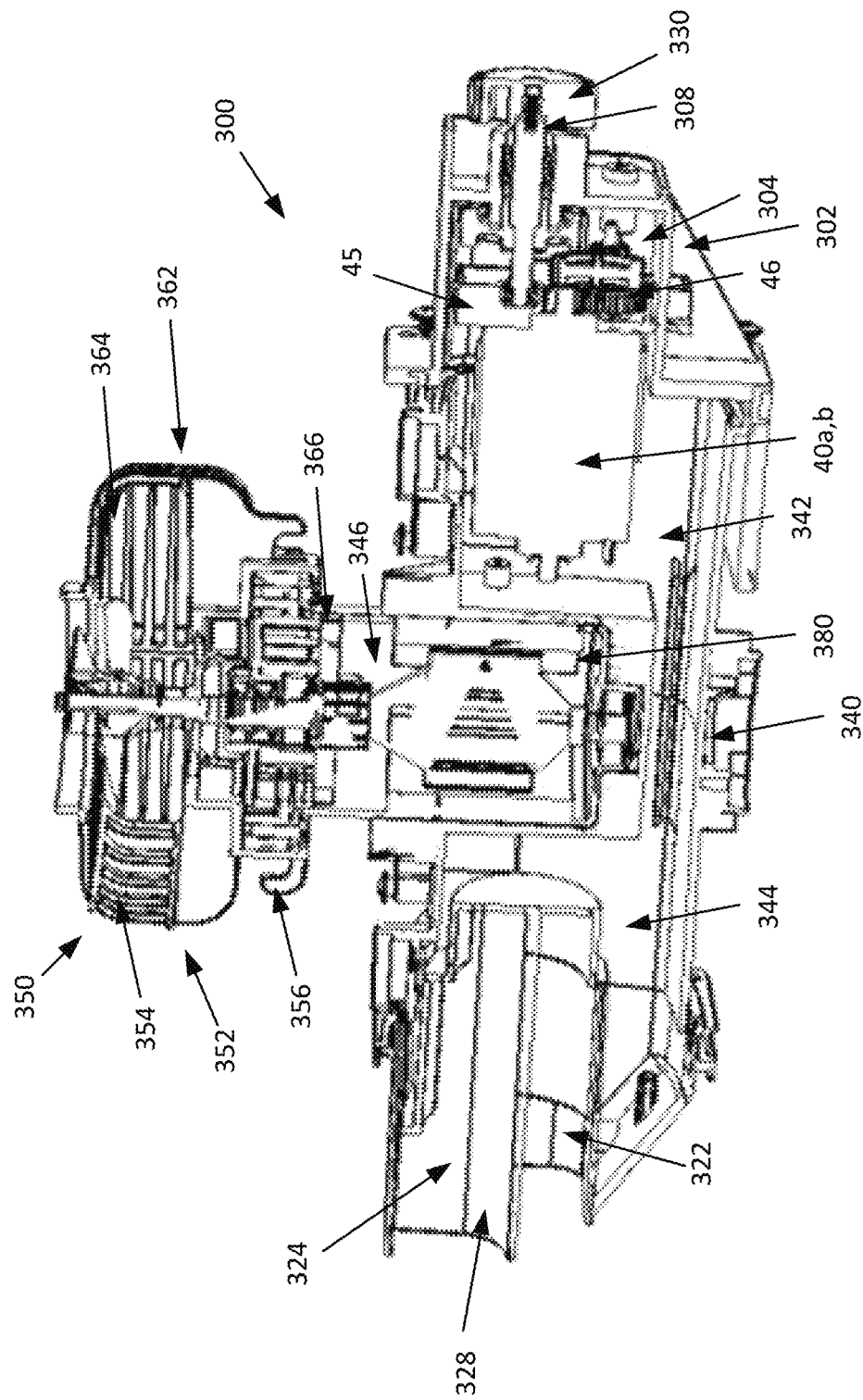
FIGS. 16 and 17 are exploded and partial views, respectively, of the motor assembly of FIG. 14.
Figure 17:
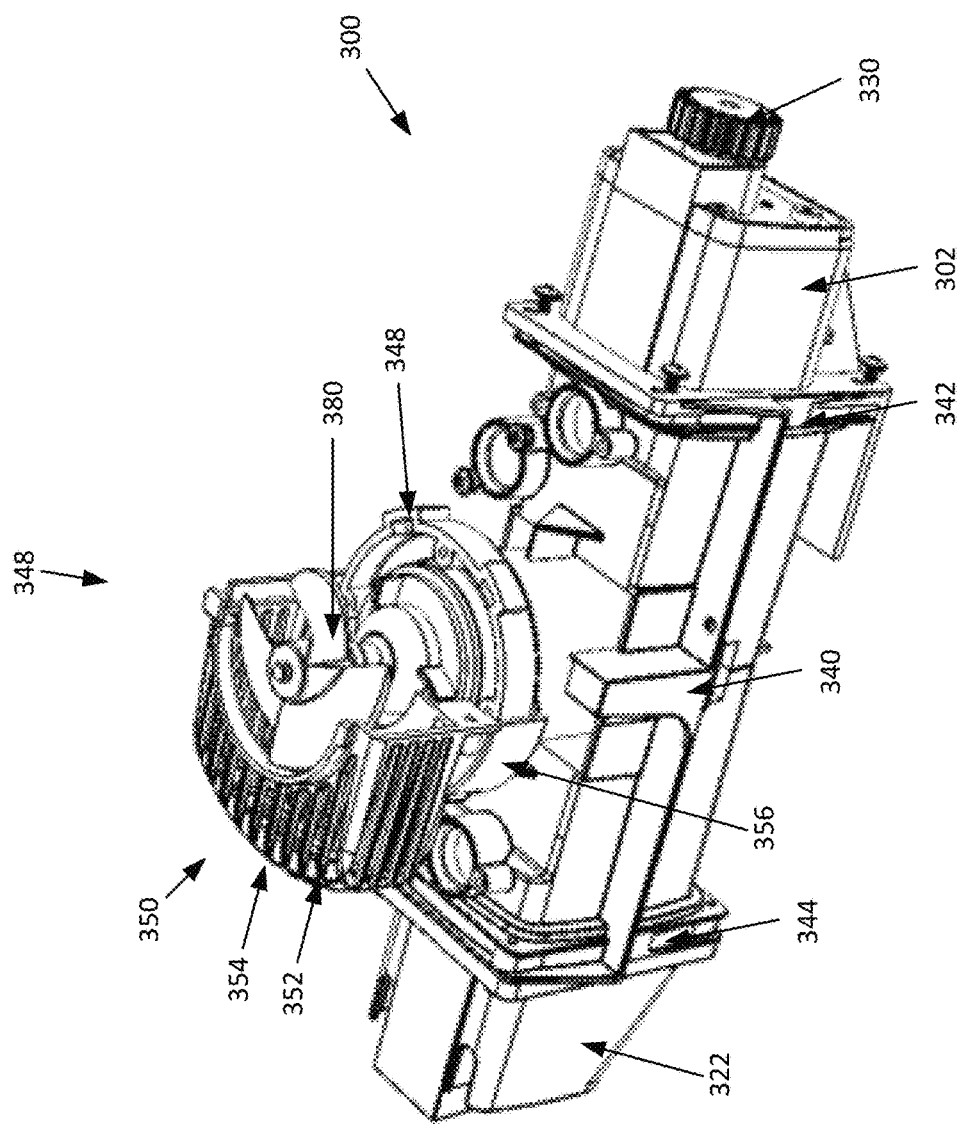

Now referring to FIGS. 14, 16, and 17, the motor assembly 300 also includes an upper opening 346 configured to receive a pump mechanism 380 and engagement elements 348 configured to rapidly, removably couple a cage 350 to the central section 340. The pump mechanism 380 may be or include a propeller and impeller configured to pull water and debris into the pool cleaner (e.g., into a filter) while also expelling water from the pool cleaner. The cage 350 is configured to protect the pump mechanism 380 from debris and/or to protect an end-user from injuring themselves on the components of the pump mechanism 380. Since the cage 350 may possibly require replacement over time, the cage 350 may be a modular cage that can be rapidly, removably coupled to the central section 340 of the motor housing 300.

In particular, the cage 350 may include a first section 352, such as a first half, with a cage portion 354 and a coupling section 356 and a second section 362, such as a second half, with a cage section 364 and a coupling section 366. The coupling sections 356, 366 may be configured to couple section 352 to section 362 while also coupling the cage 350 to the engagement elements 348 included on the central section 340. For example, the coupling section 356 may include a first protrusion configured to engage a first receiver on the coupling section 366, the coupling section 366 may include a first protrusion configured to engage a first receiver on the coupling section 356 and each coupling section 356, 366 may also include a second protrusion configured to engage the engagement elements 348 when the cage 350 is rotated into engagement with the central section 340, as shown best in FIG. 17. This allows an end-user to easily, and without the use of tools, separate the cage 350 from the central section 340 as well as first section 356 from second section 362 to allow access and simple replacement of the pump mechanism 380.

Figure 18:
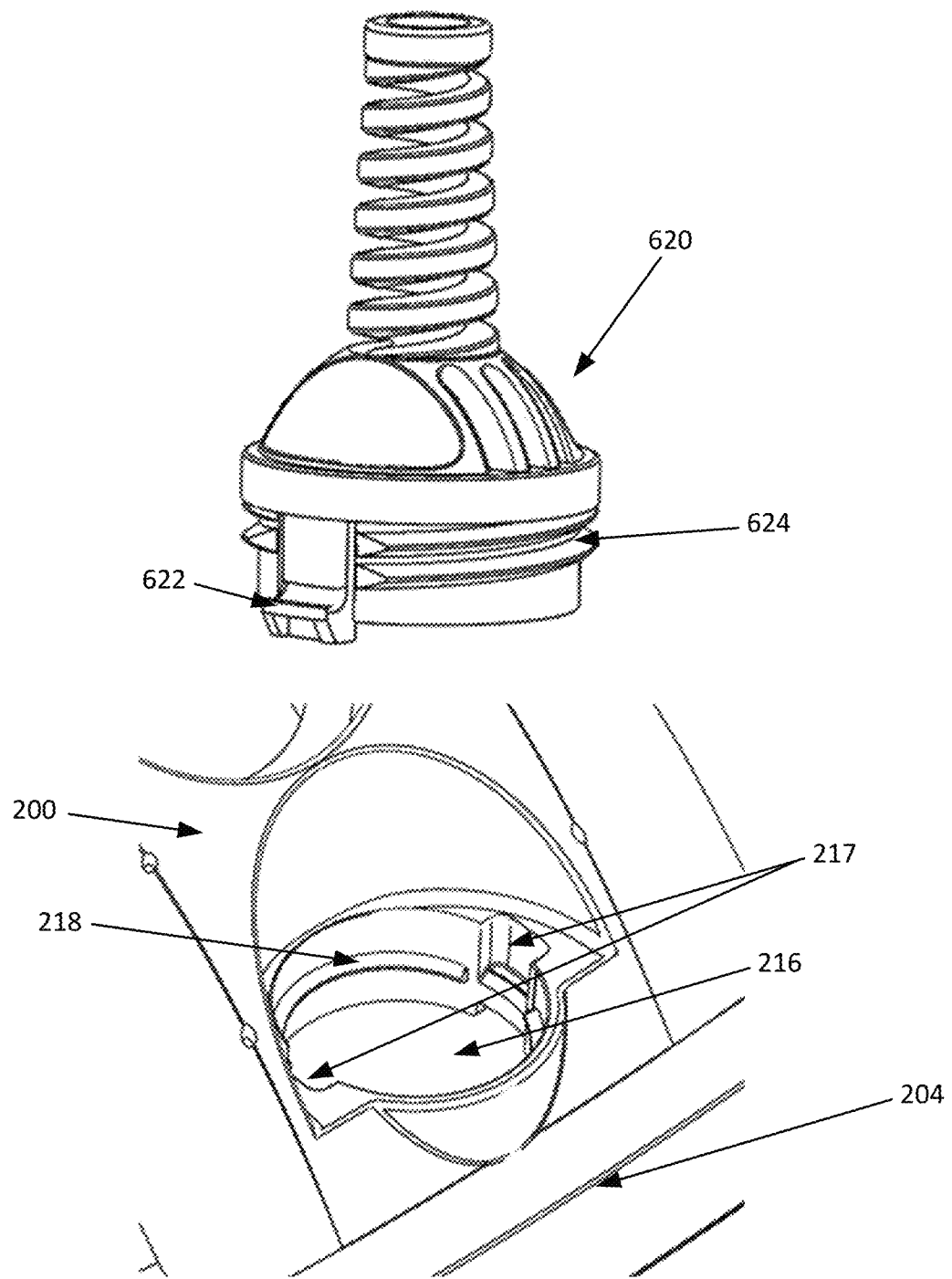
FIG. 18 is a perspective view of a cable connection for the swimming pool cleaner of FIG. 1 prior to connecting the cable connection to the swimming-pool cleaner.
Figure 19:
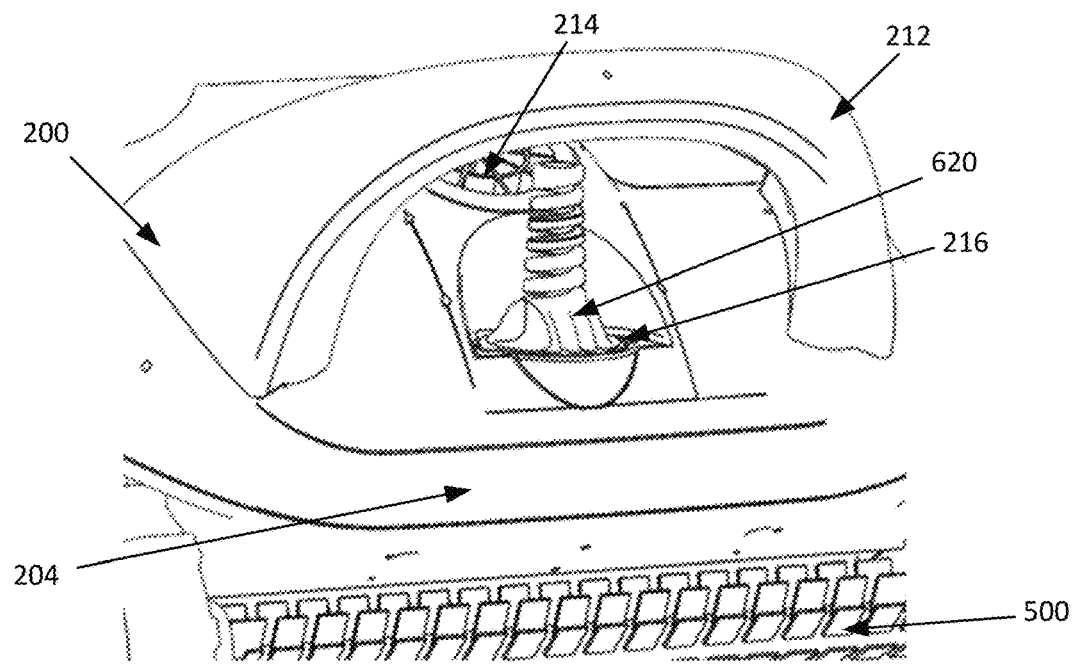
FIGS. 19 and 20 are perspective and a cross-sectional views, respectively, of the cable connection while connected to the swimming-pool cleaner of FIG. 1.
Figure 20:
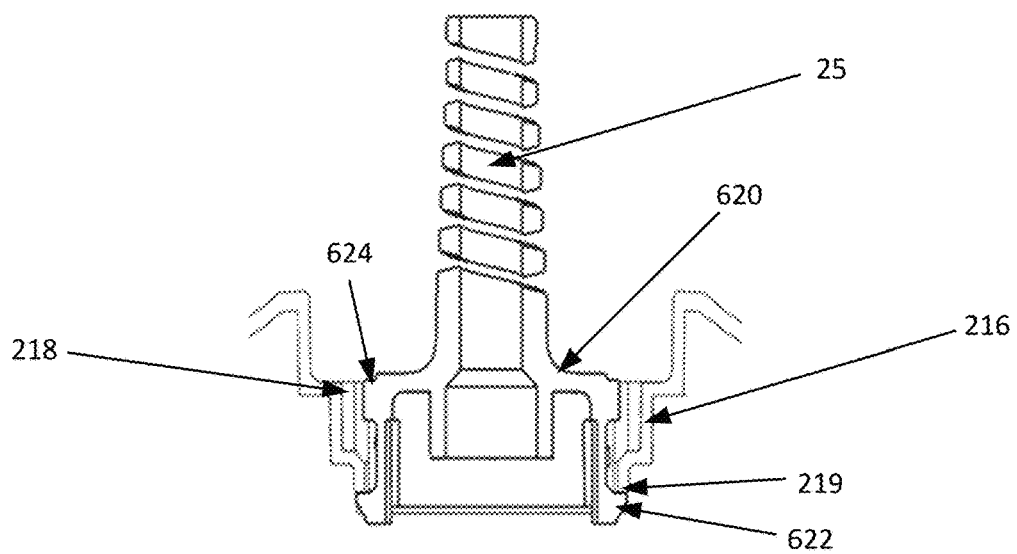

Now referring to FIGS. 18-20, with reference to FIGS. 1 and 2 as well, once a pool cleaner 10 in accordance with the present invention is assembled (e.g., by mounting a drive assembly 400 on each side of the main body 100 and mounting front and rear brush assemblies 500 therebetween), the swimming pool cleaner 10 of the present invention will also be provided with a removable filter (not shown in the images) and a cable 25 may be connected to the pool cleaner 10 in order to operatively couple the components of the pool cleaner (e.g., the motor assembly 300 and/or pump mechanism 380) to a power supply outside the swimming pool. In order to connect the pool cleaner 10 to an external power supply, the pool cleaner 10 may include a strain relief connector 620, which helps to lessen the strain supplied to the end of the cable 25 which is connected to the pool cleaner 10 (lengthening the life of the cable and pool cleaner). The strain relief connector 620 includes clamp tabs 622 and a threaded portion 624.

As shown best in FIGS. 18 and 20, the strain relief connector 620 is secured to the cleaner 10 by pushing the clamp tabs 622 through an orifice 216 provided in the top surface 210 of the cover 200 of the swimming pool cleaner 10. The orifice 216 is provided with a pair of slots 217 dimensioned to fit the clamp tabs 622 and align the connector 620 in a desired rotational orientation. Additionally, the orifice 216 may include a thread 218 configured to mate with the threaded portion 624 of the connector 620. Thus, in order to secure the connector 620 to the cleaner 10, a user may push the clamp tabs 622 though the orifice 216 into engagement with slots 217. Then, a user may rotate the connector 620 (moving the threaded portion 624 along threads 218) until the clamp tabs 622 bottom out on snapping surfaces 219 (see FIG. 20) provided in the orifice 216. The snapping surfaces 219 may provide a tactile and audial signal (a "click") indicating that the connector 620 is properly secured within the orifice 216. This combination of features and method of attachment may prevent the cable 25 from coming loose from the swimming pool cleaner 10 while also reducing pressure in the cable 25 due to pinching and bending.

As shown from the above example and as it has been indicated previously, the swimming pool cleaner of the invention has several advantages. Most notably, the swimming pool cleaner 10 of the present invention can be quickly and easily assembled or disassembled without special skills or tools. As a more specific example, the motor assembly 300, the drive assemblies 400, the cover 200 and the brush assemblies 500 can be each be coupled to the lower chassis 110 without any external fasteners, such as screws. Consequently, the pool cleaner can be reconfigured by the end-user to various configurations to upgrade or alter the pool cleaner. Moreover, a broken or worn-out portion of the pool cleaner can be easily removed and replaced or fixed.

The modular nature of the pool cleaner provided herein allows the main components (e.g., the main body 100, the motor assembly 300, the drive assemblies 400, and the brush assemblies 500) to be pre-fabricated in advance of final assembly, which creates corresponding productivity advantages, both in terms of time and cost. Since the main components of the swimming-pool cleaner can be manufactured beforehand, they can then be stocked and offered in a standardized manner to the end-user. As a consequence, the fully assembled product can be offered within short delivery schedules, without the need to maintain inventories of a wide range of modules or finished products. The modularity is also advantageous for bulk orders at least because the different components of the robot can be manufactured in a standardized manner, shipped as "knocked down assemblies" for final assembly by the retailer or even the end-user. The modularity may also reduce shipping costs by allowing compact shipping packages to be utilized.

Still further, since the brush assemblies 500 and the drive assemblies 400 included in the pool cleaner are identical, the brush assemblies 500 are interchangeable front to rear, and the side track assemblies 400 are interchangeable from side to side. These interchangeable parts, as well as the reconfigurability of the drive train and other various components included in the pool cleaner 10 also allow the end-user to customize their pool cleaner, either when ordering or subsequent to ordering. For example, a user can choose different colors and materials for some components (such as the upper chassis 200 and lower chassis 110, the drive assemblies 400 or trim 480 included on the drive assemblies, and/or the brushes 500) or different technical specifications (different number of motors, different gear ratio, different power rating, etc.) depending on the size of the swimming pool wherein the robot will be used. In other words, an end-user can customize the pool cleaner 10 according to their specific needs, perhaps without incurring additional costs. It may also be quite simple for the manufacturer, or even the customer, to create a cost estimate for a one-off or customized product based on the cost of individual modules plus fixed assembly costs.

To summarize, in one form, a kit of components or parts for assembling a swimming pool cleaner is provided herein and comprises: a lower chassis, an upper chassis, one or more drive assemblies and one or more rotary brush assemblies, wherein at least each of the components selected from the group of the upper chassis, the one or more drive assemblies and the one or more rotary brush assemblies is structurally configured such that it may be attached to and removed from the swimming-pool cleaner while the other components of the swimming-pool cleaner are assembled. In another form, a method for assembling a swimming pool cleaner is provided herein.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the pool cleaner described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:

1. A motorized, submersible, automatic cleaning device comprising:
   a chassis;
   a drive assembly that is removably secured to the chassis via a snap engagement effectuated by pressing the drive assembly against the chassis, wherein the drive assembly detaches from the chassis upon exertion of a lateral force on the drive assembly without the use of any separate fasteners or any tools.

2. The motorized, submersible, automatic cleaning device of claim 1, wherein the chassis comprises:
   a front end and a rear end; and
   a side extending between the front end and the rear end, wherein the drive assembly is removably secured to the side.

3. The motorized, submersible, automatic cleaning device of claim 1, wherein the chassis comprises:
   an upper chassis; and
   a lower chassis disposed beneath and coupled to the upper chassis, wherein the drive assembly is removably secured to the lower chassis.

4. The motorized, submersible, automatic cleaning device of claim 1, wherein the snap engagement comprises:
   a releasable engagement between a detent included on the drive assembly and an opening defined by the chassis.

5. The motorized, submersible, automatic cleaning device of claim 4, wherein the lateral force detaches the drive assembly from the chassis when the lateral force disengages the detent from the opening.

6. The motorized, submersible, automatic cleaning device of claim 4, wherein the drive assembly further comprises:
    a plurality of clasps, wherein the drive assembly is further removably secured to the chassis by engaging the plurality of clasps with a plurality of couplers included on the chassis.

7. The motorized, submersible, automatic cleaning device of claim 6, wherein the plurality of clasps slidably engage the plurality of couplers before the detent is releasably secured in the opening to effectuate the snap engagement.

8. The motorized, submersible, automatic cleaning device of claim 7, wherein the plurality of clasps and the plurality of couplers releasably secure the drive assembly to the chassis with respect to an x-direction and a z-direction that is perpendicular to the x-direction while the detent and the opening releasably secure the drive assembly to the chassis with respect to a y-direction that is perpendicular to the x-direction and the z-direction.

9. The motorized, submersible, automatic cleaning device of claim 1, wherein the drive assembly is rapidly, removably coupled to the chassis without disassembling or rearranging any other parts or assemblies included in the motorized, submersible, automatic cleaning device.

\* \* \* \* \*